US012287426B2

United States Patent
Li et al.

(10) Patent No.: US 12,287,426 B2
(45) Date of Patent: Apr. 29, 2025

(54) ECHO SIGNAL PROCESSING METHOD AND APPARATUS, SYSTEM, AND STORAGE MEDIUM

(71) Applicant: Shenzhen Yinwang Intelligent Technologies Co., Ltd., Shenzhen (CN)

(72) Inventors: Honglei Li, Beijing (CN); Tong Jiang, Beijing (CN); Qiang Li, Beijing (CN); Hongying Wu, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 330 days.

(21) Appl. No.: 17/456,223

(22) Filed: Nov. 23, 2021

(65) Prior Publication Data

US 2022/0082659 A1 Mar. 17, 2022

Related U.S. Application Data

(63) Continuation of application No. PCT/CN2019/088436, filed on May 24, 2019.

(51) Int. Cl.
 *G01S 7/41* (2006.01)
 *G01S 13/58* (2006.01)

(52) U.S. Cl.
 CPC ............ *G01S 7/415* (2013.01); *G01S 13/584* (2013.01)

(58) Field of Classification Search
 None
 See application file for complete search history.

(56) References Cited

U.S. PATENT DOCUMENTS 7,917,320 B2 3/2011 Levesque et al.
RE46,930 E * 7/2018 Mimeault ............ G01S 7/4865
(Continued)

FOREIGN PATENT DOCUMENTS

CN 102645648 A 8/2012
CN 104833979 A 8/2015
(Continued)

OTHER PUBLICATIONS

Liang, J., "Study on Realization of Dim Moving Target Detection and Tracking for Radar", Xidian University, Jan. 2014, with an English abstract, 66 pages.

(Continued)

*Primary Examiner* — Vladimir Magloire
*Assistant Examiner* — Brandon James Henson
(74) *Attorney, Agent, or Firm* — Leydig, Voit & Mayer, Ltd.

(57) ABSTRACT

A method includes: determining, a first pixel in a receiving field of view of a radar and N sampling point sets in an echo signal corresponding to the first pixel; estimating an estimated distance between the radar and a target object based on each first sampling point set of the N sampling point sets, and determining, based on each estimated distance, M cumulative receiving fields of view in a one-to-one correspondence with M data frames; determining a second sampling point set in echo signals corresponding to Q neighboring pixels, and superposing each first sampling point set and the corresponding second sampling point set to obtain an echo signal that corresponds to the first pixel and that is obtained; and calculating an actual distance between the radar and the target object based on the echo signal obtained after superposition processing.

20 Claims, 8 Drawing Sheets

(56) References Cited

U.S. PATENT DOCUMENTS

2009/0119044 A1    5/2009  Levesque et al.
2017/0285146 A1 * 10/2017  Iida .................... G01S 17/42
2019/0104300 A1    4/2019  Achilefu et al.

FOREIGN PATENT DOCUMENTS

| CN | 105137420 A | 12/2015 | |
|---|---|---|---|
| CN | 106338721 A | 1/2017 | |
| CN | 106526567 A | 3/2017 | |
| CN | 108519594 A | 9/2018 | |
| CN | 108802722 A | 11/2018 | |
| CN | 109254271 A | 1/2019 | |
| CN | 109782248 A | 5/2019 | |
| WO | WO-2019064062 A1 * | 4/2019 | ............ B60S 1/02 |

OTHER PUBLICATIONS

Lanling, W et al., "New Inter-Frame Accumulation Method in Range-Doppler Domain for Dim Target Detection", Aero Weaponry, 2010 No. 5, Oct. 2010, with an English abstract, 4 pages.
Yoshioka, K. et al., "A 20ch TDC/ADC Hybrid SoC for 240x96-Pixel 10%-Reflection 0.125%-Precision 200m-Range Imaging LiDAR with Smart Accumulation Technique", ISSCC 2018/Session 5/Image Sensors/5.7, Feb. 11-15, 2018, 3 pages.
Su, J. et al., "Long range detection of line-array multi-pulsed coding lidar by combining the Accumulation coherence and Subpixel-energy detection method", Optics Express, 15174, vol. 23, No. 12, Jun. 15, 2015, 12 pages.

* cited by examiner

```
┌─────────────────────────────────────────────────────────────────────┐
│ A radar determines, in a current data frame, a first pixel in a receiving field of view │
│ of the radar and N sampling point sets in an echo signal corresponding to the first     │
│ pixel, where N is an integer greater than or equal to 1, and the first pixel is any pixel│  S201
│                        in the receiving field of view                                   │
└─────────────────────────────────────────────────────────────────────┘
                                         │
                                         ▼
┌─────────────────────────────────────────────────────────────────────┐
│ The radar estimates an estimated distance between the radar and a target object based │
│ on each first sampling point set of the N sampling point sets, and determines, based  │
│ on each estimated distance, M cumulative receiving fields of view in a one-to-one     │  S202
│ correspondence with M data frames, where each of the M cumulative receiving           │
│ fields of view includes at least one neighboring pixel of the first pixel, the M data │
│ frames are M data frames received by the radar before the radar receives the current  │
│ data frame, M is an integer greater than or equal to 1, and the first sampling point set│
│                        is any one of the N sampling point sets                        │
└─────────────────────────────────────────────────────────────────────┘
                                         │
                                         ▼
┌─────────────────────────────────────────────────────────────────────┐
│  The radar determines, based on each first sampling point set, a second sampling      │
│ point set in echo signals corresponding to Q neighboring pixels in the M cumulative   │
│     receiving fields of view, and superposes each first sampling point set and the    │
│ corresponding second sampling point set to obtain an echo signal that corresponds to  │  S203
│    the first pixel and that is obtained after superposition processing, where Q is an │
│                        integer greater than or equal to 1                             │
└─────────────────────────────────────────────────────────────────────┘
                                         │
                                         ▼
┌─────────────────────────────────────────────────────────────────────┐
│ The radar calculates an actual distance between the radar and the target object based │
│     on the echo signal that corresponds to the first pixel and that is obtained after │  S204
│                                 superposition processing                              │
└─────────────────────────────────────────────────────────────────────┘
```

FIG. 2

For each estimated distance, a radar determines a maximum horizontal movement angle value and a maximum vertical movement angle value of a target object for each estimated distance based on a maximum relative motion speed between the radar and the target object, a data frame period, the estimated distance, and a maximum horizontal angle of view, a total horizontal angle of view, a maximum vertical angle of view, and a total vertical angle of view that are of the radar ⎯ S301

For each estimated distance, the radar determines a cumulative receiving field of view of the radar in any data frame based on a frame number difference i between a current data frame and the any data frame, a horizontal angle value and a vertical angle value of a first pixel, the maximum horizontal movement angle value of the target object, and the maximum vertical movement angle value of the target object, where $1 \leq i \leq M$, and i is an integer ⎯ S302

FIG. 3

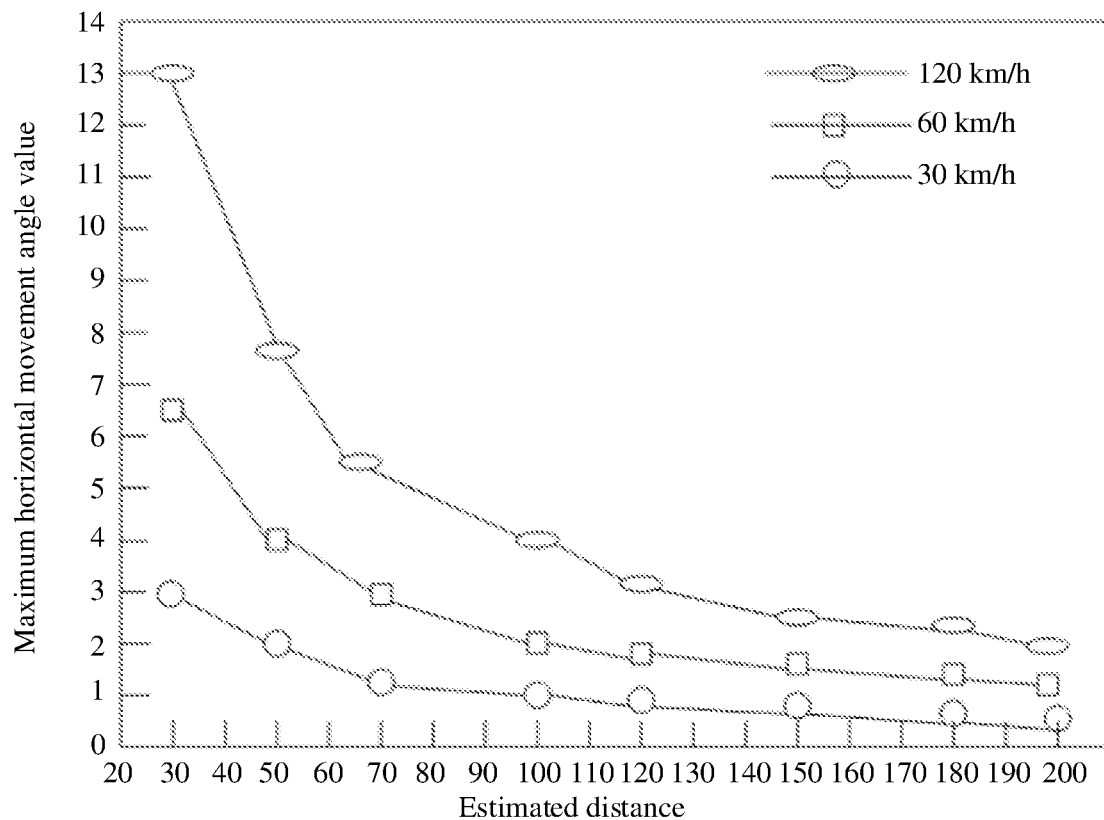

FIG. 4

ECHO SIGNAL PROCESSING METHOD AND APPARATUS, SYSTEM, AND STORAGE MEDIUM

CROSS-REFERENCE TO RELATED APPLICATIONS

This application is a continuation of International Application No. PCT/CN2019/088436, filed on May 24, 2019, the disclosure of which is hereby incorporated by reference in its entirety.

TECHNICAL FIELD

This application relates to the field of signal processing technologies, and in particular, to an echo signal processing method and apparatus, a system, and a storage medium.

BACKGROUND

Light detection and ranging (LiDAR) is an optical remote sensing technology in which an electromagnetic wave from an ultraviolet band to a far infrared band is used to obtain related information of a target object by detecting a scattered light characteristic of the target object. The LiDAR has high measurement accuracy and fine time and space resolution, can implement functions of ranging, target detection, tracking, imaging recognition, and the like, and has broad application prospects in intelligent transportation, self-driving, atmospheric environment monitoring, geographic mapping, unmanned aerial vehicles, and other fields.

Ranging is a basic function of a radar. FIG. 1 is a schematic diagram of a radar according to a conventional technology. As shown in FIG. 1, the radar 10 includes a signal processing unit 11, a laser driver circuit 12, a laser 13, a scanning device 14, an optical transmitting element 15, an optical receiving element 16, a detector 17, and an analog front end 18. The analog front end 18 may include a transimpedance amplifier (TIA) and an analog-to-digital converter (ADC). A ranging principle of the radar is as follows. The signal processing unit 11 transmits a pulse signal to the laser driver circuit 12, the laser driver circuit 12 modulates the pulse signal to the laser 13, the laser 13 transmits a pulsed optical signal, and the scanning device 14 and the optical transmitting element 15 respectively scan and shape the optical signal. The optical receiving element 16 performs focusing and shaping processing on light reflected from a target object, the detector 17 receives an optical signal that has been processed by the optical receiving element 16, converts the optical signal into a current signal, and transmits the current signal to the TIA in the analog front end 18, and the TIA may amplify the current signal and convert the current signal into a voltage signal, where the voltage signal is an analog signal. The ADC in the analog front end 18 may convert the voltage signal into a digital signal, where a digital signal obtained by the ADC in one sampling period may be referred to as an echo signal. Finally, the signal processing unit 11 measures a distance between the radar and the target object based on the digital signal.

When there is a long distance between the radar and the target object or a reflectivity of the target object is relatively low, energy of the optical signal is seriously attenuated, and the signal is submerged in noise such as background light noise, shot noise, or thermal noise. Consequently, a signal-to-noise ratio is low, and accuracy of radar ranging is reduced. Therefore, how to increase a signal-to-noise ratio of an echo signal to improve the accuracy of radar ranging is a technical problem that urgently needs to be resolved in this application.

SUMMARY

This application provides an echo signal processing method and apparatus, a system, and a storage medium, to increase a signal-to-noise ratio of an echo signal to improve accuracy of radar ranging.

According to a first aspect, this application provides an echo signal processing method, including: determining, in a current data frame, a first pixel in a receiving field of view of a radar and N sampling point sets in an echo signal corresponding to the first pixel, where N is an integer greater than or equal to 1, and the first pixel is any pixel in the receiving field of view; estimating an estimated distance between the radar and a target object based on each first sampling point set of the N sampling point sets, and determining, based on each estimated distance, M cumulative receiving fields of view in a one-to-one correspondence with M data frames, where each of the M cumulative receiving fields of view includes at least one neighboring pixel of the first pixel, the M data frames are M data frames received by the radar before the radar receives the current data frame, M is an integer greater than or equal to 1, and the first sampling point set is any one of the N sampling point sets; determining, based on each first sampling point set, a second sampling point set in echo signals corresponding to Q neighboring pixels in the M cumulative receiving fields of view, and superposing each first sampling point set and the corresponding second sampling point set to obtain an echo signal that corresponds to the first pixel and that is obtained after superposition processing, where Q is an integer greater than or equal to 1; and calculating an actual distance between the radar and the target object based on the echo signal that corresponds to the first pixel and that is obtained after superposition processing.

In this application, considering a correlation to an object in space, a detector in the radar receives, at one angle and adjacent angles and in pixels in a plurality of adjacent data frames, echo signals whose pulse locations and amplitudes are close to each other. Therefore, when a signal-to-noise ratio of an echo signal is relatively low, inter-frame signal multiplexing is implemented to increase the signal-to-noise ratio of the echo signal, thereby improving ranging accuracy.

Optionally, the estimating an estimated distance between the radar and a target object based on each first sampling point set of the N sampling point sets includes: determining the estimated distance between the radar and the target object based on location information of an inflection point in each first sampling point set of the N sampling point sets.

Optionally, the radar may determine a cumulative receiving field of view in the following several optional manners.

In an optional manner 1, the determining, based on each estimated distance, M cumulative receiving fields of view in a one-to-one correspondence with M data frames includes: determining a maximum horizontal movement angle value and a maximum vertical movement angle value of the target object for each estimated distance based on a maximum relative motion speed between the radar and the target object, a data frame period, the estimated distance, and a maximum horizontal angle of view, a total horizontal angle of view, a maximum vertical angle of view, and a total vertical angle of view that are of the radar; and determining a cumulative receiving field of view of the radar in any data frame based on a frame number difference i between the current data frame and the any data frame, a horizontal angle value and a vertical angle value of the first pixel, the maximum horizontal movement angle value of the target object, and the maximum vertical movement angle value of the target object, where 1≤i≤M, and i is an integer.

The cumulative receiving field of view of the radar in the any data frame may be determined according to the following formula:

$$A=(h-HA(d)*i, h+HA(d)*i, v-VA(d)*i, v+VA(d)*i),$$

where

A represents the cumulative receiving field of view of the radar in the any data frame, h−HA(d)*i represents a minimum horizontal angle value of A, h+HA(d)*i represents a maximum horizontal angle value of A, v−VA(d)*i represents a minimum vertical angle value of A, v+VA(d) represents a maximum vertical angle value of A, d represents the estimated distance, HA(d) and VA(d) respectively represent the maximum horizontal movement angle value of the target object and the maximum vertical movement angle value of the target object, h represents the horizontal angle value of the first pixel, and v represents the vertical angle value of the first pixel.

In an optional manner 2, before the determining a cumulative receiving field of view of the radar in any data frame based on a frame number difference i between the current data frame and the any data frame, a horizontal angle value and a vertical angle value of the first pixel, the maximum horizontal movement angle value of the target object, and the maximum vertical movement angle value of the target object, the method further includes: obtaining a size of the target object; and correspondingly, the determining a cumulative receiving field of view of the radar in any data frame based on a frame number difference i between the current data frame and the any data frame, a horizontal angle value and a vertical angle value of the first pixel, the maximum horizontal movement angle value of the target object, and the maximum vertical movement angle value of the target object includes: determining the cumulative receiving field of view of the radar in the any data frame based on the frame number difference i between the current data frame and the any data frame, the horizontal angle value and the vertical angle value of the first pixel, the maximum horizontal movement angle value of the target object, the maximum vertical movement angle value of the target object, and the size of the target object.

The cumulative receiving field of view of the radar in the any data frame may be determined according to the following formula:

$$A = \left(h - \text{int}\left(\frac{TH-1}{2}\right) - HA(d)*i, h + \text{int}\left(\frac{TH-1}{2}\right) + HA(d)*i, v - \text{int}\left(\frac{TV-1}{2}\right) - VA(d)*i, v + \text{int}\left(\frac{TV-1}{2}\right) + VA(d)*i\right),$$

where

A represents the cumulative receiving field of view of the radar in the any data frame, h−HA(d)*i represents a minimum horizontal angle value of A, h+HA(d)*i represents a maximum horizontal angle value of A, v−VA(d)*i represents a minimum vertical angle value of A, v+VA(d) represents a maximum vertical angle value of A, d represents the estimated distance, HA(d) and VA(d) respectively represent the maximum horizontal movement angle value of the target object and the maximum vertical movement angle value of the target object, h represents the horizontal angle value of the first pixel, v represents the vertical angle value of the first pixel, and TH and TV respectively represent a horizontal angle value and a vertical angle value of the target object.

In an optional manner 3, the determining, based on each estimated distance, M cumulative receiving fields of view in a one-to-one correspondence with M data frames includes: for each estimated distance, if the estimated distance falls within a target distance interval, and the target distance interval corresponds to a cumulative receiving field of view, using the cumulative receiving field of view corresponding to the target distance interval as a cumulative receiving field of view of the radar in any data frame.

According to any of the foregoing optional manners, the cumulative receiving field of view of the radar in the any data frame can be effectively determined. The radar can determine a neighboring pixel of the first pixel only based on this, and further accumulate sampling point sets to increase a signal-to-noise ratio of the echo signal, thereby improving ranging accuracy.

Optionally, before the estimating an estimated distance between the radar and a target object based on each first sampling point set of the N sampling point sets, and determining, based on each estimated distance, M cumulative receiving fields of view in a one-to-one correspondence with M data frames, the method further includes: determining a signal-to-noise ratio of the echo signal corresponding to the first pixel or a signal-to-noise ratio of at least one first sampling point set; and correspondingly, the estimating an estimated distance between the radar and a target object based on each first sampling point set of the N sampling point sets, and determining, based on each estimated distance, M cumulative receiving fields of view in a one-to-one correspondence with M data frames includes: if the signal-to-noise ratio of the echo signal corresponding to the first pixel or the signal-to-noise ratio of the at least one first sampling point set is less than a preset signal-to-noise ratio, estimating the estimated distance between the radar and the target object based on each first sampling point set of the N sampling point sets, and determining, based on each estimated distance, the M cumulative receiving fields of view in a one-to-one correspondence with the M data frames.

In other words, the radar determines the cumulative receiving fields of view only when the foregoing condition is satisfied, to implement inter-frame signal multiplexing. On the contrary, when the foregoing condition is not satisfied, the radar does not need to determine the cumulative receiving fields of view, and does not need to implement inter-frame signal multiplexing either, thereby improving signal processing flexibility of the radar.

The radar may obtain, in the following several manners, the echo signal that corresponds to the first pixel and that is obtained after superposition processing.

In an optional manner 1, the determining, based on each first sampling point set, a second sampling point set in echo signals corresponding to Q neighboring pixels in the M cumulative receiving fields of view, and superposing each first sampling point set and the corresponding second sampling point set to obtain an echo signal that corresponds to the first pixel and that is obtained after superposition processing includes: for each first sampling point set, determining, in a preset order of the Q neighboring pixels based on information about a first inflection point in the first sampling point set and location information of an inflection point in an echo signal corresponding to the first neighboring pixel, a second inflection point in the echo signal corresponding to the first neighboring pixel, where a distance between the first inflection point and the second inflection point is less than a sampling point threshold; superposing the first sampling point set and a sampling point set to which the second inflection point belongs, to obtain a superposed sampling point set; and determining a to-be-superposed sampling point set in an echo signal corresponding to the second neighboring pixel, superposing the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtaining the echo signal that corresponds to the first pixel and that is obtained after superposition processing.

In an optional manner 2, the determining, based on each first sampling point set, a second sampling point set in echo signals corresponding to Q neighboring pixels in the M cumulative receiving fields of view, and superposing each first sampling point set and the corresponding second sampling point set to obtain an echo signal that corresponds to the first pixel and that is obtained after superposition processing includes: for each first sampling point set, determining, in a preset order of the Q neighboring pixels based on information about a first inflection point in the first sampling point set and location information of an inflection point in an echo signal corresponding to the first neighboring pixel, a second inflection point in the echo signal corresponding to the first neighboring pixel, where a distance between the first inflection point and the second inflection point is less than a sampling point threshold; determining a correlation coefficient between the first sampling point set and a sampling point set to which the second inflection point belongs; superposing the first sampling point set and the sampling point set to which the second inflection point belongs if it is determined, based on the correlation coefficient, that the first sampling point set and the sampling point set to which the second inflection point belongs can be superposed, to obtain a superposed sampling point set; and determining a to-be-superposed sampling point set in an echo signal corresponding to the second neighboring pixel, superposing the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtaining the echo signal that corresponds to the first pixel and that is obtained after superposition processing.

The superposing the first sampling point set and the sampling point set to which the second inflection point belongs if it is determined, based on the correlation coefficient, that the first sampling point set and the sampling point set to which the second inflection point belongs can be superposed, to obtain a superposed sampling point set includes: if the correlation coefficient is greater than a preset threshold, superposing the first sampling point set and the sampling point set to which the second inflection point belongs, to obtain the superposed sampling point set; or if the correlation coefficient is greater than a preset threshold, obtaining an attribute value of the echo signal corresponding to the first pixel and an attribute value of the echo signal corresponding to the first neighboring pixel, where the attribute value includes any one of the following: a signal amplitude, a peak-to-average ratio, or a signal-to-noise ratio; and if the attribute value of the echo signal corresponding to the first pixel and the attribute value of the echo signal corresponding to the first neighboring pixel satisfy a preset condition, superposing the first sampling point set and the sampling point set to which the second inflection point belongs, to obtain the superposed sampling point set. The preset condition is that a weighted average value of the attribute value of the echo signal corresponding to the first pixel and the attribute value of the echo signal corresponding to the first neighboring pixel is greater than the attribute value of the echo signal corresponding to the first pixel; or the preset condition is that the attribute value of the echo signal corresponding to the first neighboring pixel is greater than a preset multiple of the attribute value of the echo signal corresponding to the first pixel.

According to either of the foregoing optional manners, sampling point sets can be effectively accumulated to increase the signal-to-noise ratio of the echo signal, thereby improving ranging accuracy.

Optionally, the radar further includes an analog-to-digital converter (ADC), and correspondingly, the method further includes: determining a maximum movement distance of the target object in a data frame period based on the maximum relative motion speed between the radar and the target object and the data frame period; determining a quantity of sampling points in the maximum movement distance based on a sampling rate of the ADC; and determining the sampling point threshold based on a frame number difference between the current data frame and a data frame in which the first neighboring pixel exists and the quantity of sampling points. Based on this, the sampling point threshold can be effectively determined.

Optionally, the determining the sampling point threshold based on a frame number difference between the current data frame and a data frame in which the first neighboring pixel exists and the quantity of sampling points includes: calculating a product of the frame number difference between the current data frame and the data frame in which the first neighboring pixel exists and the quantity of sampling points, to obtain a product result; and calculating a sum of the product result and an allowable error to obtain the sampling point threshold.

Optionally, after the determining, in a current data frame, a first pixel in a receiving field of view of a radar and N sampling point sets in an echo signal corresponding to the first pixel, the method further includes: allocating storage space for information about the first pixel, where the storage space can be reused; and the information about the first pixel includes at least one of the following: the N sampling point sets, location information of at least one inflection point in the N sampling point sets, and the signal-to-noise ratio of the echo signal corresponding to the first pixel. In this way, data storage space is saved.

According to a second aspect, this application provides an echo signal processing apparatus, including: a first determining module, configured to determine, in a current data frame, a first pixel in a receiving field of view of a radar and N sampling point sets in an echo signal corresponding to the first pixel, where N is an integer greater than or equal to 1, and the first pixel is any pixel in the receiving field of view; an estimation module, configured to estimate an estimated distance between the radar and a target object based on each first sampling point set of the N sampling point sets; a second determining module, configured to determine, based on each estimated distance, M cumulative receiving fields of view in a one-to-one correspondence with M data frames, where each of the M cumulative receiving fields of view includes at least one neighboring pixel of the first pixel, the M data frames are M data frames received by the radar before the radar receives the current data frame, M is an integer greater than or equal to 1, and the first sampling point set is any one of the N sampling point sets; a third determining module, configured to determine, based on each first sampling point set, a second sampling point set in echo signals corresponding to Q neighboring pixels in the M cumulative receiving fields of view; a superposition module, configured to superpose each first sampling point set and the corresponding second sampling point set to obtain an echo signal that corresponds to the first pixel and that is obtained after superposition processing, where Q is an integer greater than or equal to 1; and a calculation module, configured to calculate an actual distance between the radar and the target object based on the echo signal that corresponds to the first pixel and that is obtained after superposition processing.

According to a third aspect, this application provides a radar, including a transceiver and a processor, where the transceiver is configured to receive an echo signal generated due to reflection of a target object, and the processor is configured to run program instructions to perform the echo signal processing method in the first aspect or the optional manners of the first aspect based on the echo signal received by the transceiver.

According to a fourth aspect, this application further provides a computer program product. The computer program product includes computer instructions, and the computer instructions are used to implement the echo signal processing method in the first aspect or the optional manners of the first aspect.

According to a fifth aspect, this application further provides a storage medium, including a readable storage medium and computer instructions. The computer instructions are stored in the readable storage medium, and the computer instructions are used to implement the echo signal processing method in the first aspect or the optional manners of the first aspect.

This application provides the echo signal processing method and apparatus, the system, and the storage medium. The method includes: determining, in a current data frame, a first pixel in a receiving field of view of a radar and N sampling point sets in an echo signal corresponding to the first pixel, where N is an integer greater than or equal to 1, and the first pixel is any pixel in the receiving field of view; estimating an estimated distance between the radar and a target object based on each first sampling point set of the N sampling point sets, and determining, based on each estimated distance, M cumulative receiving fields of view in a one-to-one correspondence with M data frames, where each of the M cumulative receiving fields of view includes at least one neighboring pixel of the first pixel, the M data frames are M data frames received by the radar before the radar receives the current data frame, M is an integer greater than or equal to 1, and the first sampling point set is any one of the N sampling point sets; determining, based on each first sampling point set, a second sampling point set in echo signals corresponding to Q neighboring pixels in the M cumulative receiving fields of view, and superposing each first sampling point set and the corresponding second sampling point set to obtain an echo signal that corresponds to the first pixel and that is obtained after superposition processing, where Q is an integer greater than or equal to 1; and calculating an actual distance between the radar and the target object based on the echo signal that corresponds to the first pixel and that is obtained after superposition processing. In this application, considering a correlation to an object in space, the detector in the radar receives, at one angle and adjacent angles and in pixels in a plurality of adjacent data frames, echo signals whose pulse locations and amplitudes are close to each other. Therefore, when a signal-to-noise ratio of an echo signal is relatively low, inter-frame signal multiplexing is implemented to increase the signal-to-noise ratio of the echo signal, thereby improving ranging accuracy.

BRIEF DESCRIPTION OF THE DRAWINGS

FIG. 2 is a flowchart of an echo signal processing method according to an embodiment of this application;

FIG. 3 is a flowchart of a method for determining a cumulative receiving field of view according to an embodiment of this application;

FIG. 4 is a schematic diagram of a correspondence between a relative motion speed, a distance, and a maximum horizontal movement angle value according to an embodiment of this application;

DETAILED DESCRIPTION OF ILLUSTRATIVE EMBODIMENTS

Figure 1:
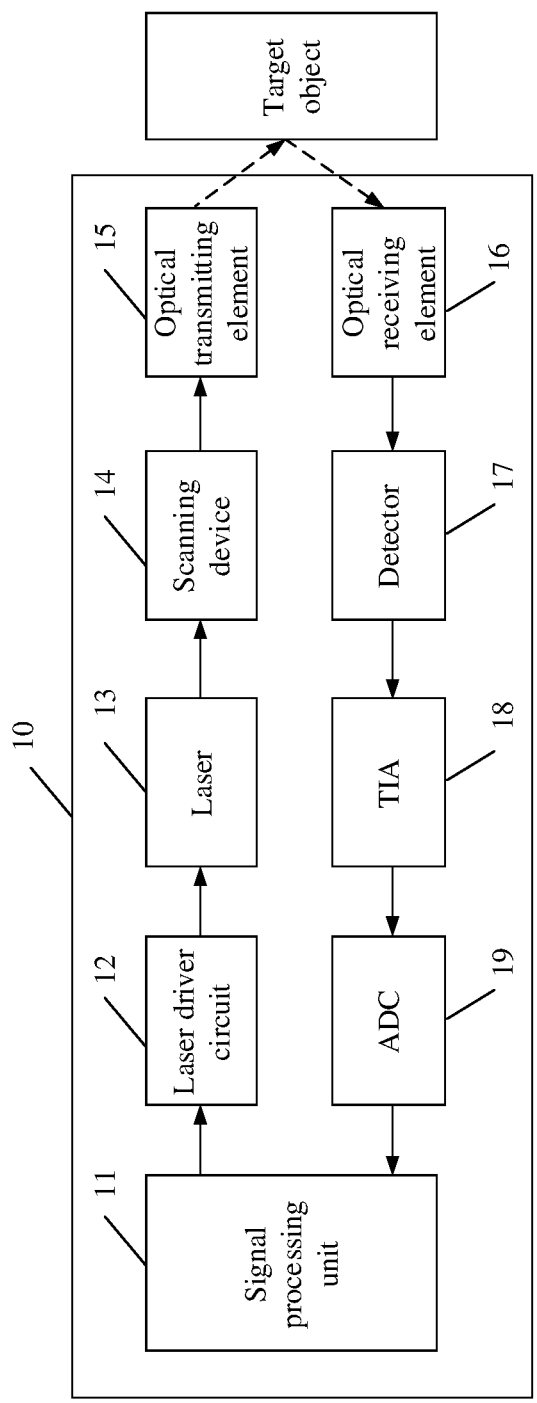
FIG. 1 is a schematic diagram of a radar according to a conventional technology.

As described above, a signal-to-noise ratio of an echo signal directly affects accuracy of radar ranging. Therefore, how to increase the signal-to-noise ratio of the echo signal to improve the accuracy of radar ranging is a technical problem that urgently needs to be resolved in this application. Based on this, this application provides an echo signal processing method and apparatus, a system, and a storage medium. Before the technical solutions in this application are described, terms used in this application are described below.

Data frame: An optical receiving element in a radar may obtain a frame of data in a scanning cycle through optical path design by using a scanning device, where the data frame includes information about a plurality of pixels.

A receiving field of view of the radar: The receiving field of view includes four dimension values: a minimum horizontal angle value, a maximum horizontal angle value, a minimum vertical angle value, and a maximum vertical angle value.

Pixel: Each distance measurement unit in a receiving field of view in a frame of data is one pixel, and each pixel corresponds to one echo signal. For example, for the radar, assuming that the optical receiving element corresponds to 10 angles in a horizontal direction and corresponds to four angles in a vertical direction, from a perspective of space, the receiving field of view may be divided into 40 grids, and each grid corresponds to one distance measurement unit, that is, one pixel, in space.

Pixel information: For example, from a perspective of space, a receiving field of view may be divided into 40 grids, each grid corresponds to one pixel in space, and information about 40 pixels may be obtained through measurement in one scanning period, or in other words, one frame of data includes information about 40 pixels. Information about each pixel includes at least one of the following: N sampling point sets in an echo signal corresponding to the pixel, location information of at least one inflection point in the N sampling point sets, the echo signal corresponding to the pixel, a signal-to-noise ratio of the echo signal corresponding to the pixel, a signal-to-noise ratio of a sampling point set in the echo signal, horizontal and vertical angles corresponding to the pixel, an actual distance that is between the radar and a target object and that is to be mentioned below, and other information. It should be noted that the actual distance is a distance that is between the radar and the target object and that is determined based on a location of an inflection point, but the inflection point may be a noise point. Therefore, there may be an error between the actual distance and a true distance between the radar and the target object.

Intra-frame pixel signal multiplexing: Multiplexing processing performed on echo signals corresponding to a plurality of pixels in one frame of data is referred to as intra-frame pixel signal multiplexing. "Multiplexing" in the intra-frame pixel signal multiplexing refers to accumulation of entire waveforms of echo signals corresponding to at least two pixels in one frame of data or accumulation of segmented waveforms of the echo signals corresponding to the at least two pixels, and the accumulation may be direct accumulation, or may be accumulation performed in a manner such as an arithmetic average method, a geometric average method, a square average method, a harmonic average method, or a weighted average method.

Inter-frame pixel signal multiplexing: Multiplexing processing performed on echo signals corresponding to a plurality of adjacent data frames is referred to as inter-frame multi-pixel signal multiplexing. "Multiplexing" in the inter-frame pixel signal multiplexing refers to accumulation of entire waveforms of echo signals corresponding to at least two pixels that belong to different data frames or accumulation of segmented waveforms of the echo signals corresponding to the at least two pixels, and the accumulation may be direct accumulation, or may be accumulation performed in a manner such as an arithmetic average method, a geometric average method, a square average method, a harmonic average method, or a weighted average method.

Further, a signal-to-noise ratio is a ratio of a signal peak amplitude to a root mean square of noise. The signal-to-noise ratio in this application may be a peak signal-to-noise ratio or another form of signal-to-noise ratio. Based on this, a main idea of this application is: Considering a correlation to an object in space, a detector in a radar receives, at one angle and adjacent angles and in pixels in a plurality of adjacent data frames, echo signals whose pulse locations and amplitudes are close to each other. Therefore, when a signal-to-noise ratio of an echo signal is relatively low, signal multiplexing is implemented to increase the signal-to-noise ratio of the echo signal, thereby improving ranging accuracy. This application focuses on a description of an inter-frame pixel signal multiplexing solution.

Specifically, FIG. 2 is a flowchart of an echo signal processing method according to an embodiment of this application. The method may be performed by the radar shown in FIG. 1, the signal processing unit in the system, or the like. The following describes the echo signal processing method by using an example in which the method is performed by a radar. It should be noted that the radar in this application is not limited to the radar shown in FIG. 1. For example, a noise reduction and filtering module may alternatively be disposed between an ADC and a signal processing unit. The filtering and noise reduction module may perform filtering and noise reduction on a digital signal output by the ADC. The noise reduction and filtering module may be a filter with a function such as matched filtering, Gaussian filtering, smooth filtering, or Wiener filtering. For another example, this application is also applicable to other radars such as a millimeter-wave radar and an ultrasonic wave radar based on pulse emission. As shown in FIG. 2, the method includes the following steps.

Step S201: The radar determines, in a current data frame, a first pixel in a receiving field of view of the radar and N sampling point sets in an echo signal corresponding to the first pixel, where N is an integer greater than or equal to 1, and the first pixel is any pixel in the receiving field of view.

Step S202: The radar estimates an estimated distance between the radar and a target object based on each first sampling point set of the N sampling point sets, and determines, based on each estimated distance, M cumulative receiving fields of view in a one-to-one correspondence with M data frames, where each of the M cumulative receiving fields of view includes at least one neighboring pixel of the first pixel, the M data frames are M data frames received by the radar before the radar receives the current data frame, M is an integer greater than or equal to 1, and the first sampling point set is any one of the N sampling point sets.

Step S203: The radar determines, based on each first sampling point set, a second sampling point set in echo signals corresponding to Q neighboring pixels in the M cumulative receiving fields of view, and superposes each first sampling point set and the corresponding second sampling point set to obtain an echo signal that corresponds to the first pixel and that is obtained after superposition processing, where Q is an integer greater than or equal to 1.

Step S204: The radar calculates an actual distance between the radar and the target object based on the echo signal that corresponds to the first pixel and that is obtained after superposition processing.

Step S201 is described as follows.

One data frame includes information about a plurality of pixels, and each pixel corresponds to one echo signal. It is assumed that the first pixel is represented by (x, y, z), where x represents a column coordinate of the first pixel, y represents a row coordinate of the first pixel, and z represents a frame number of the current data frame. For example, if the current data frame is the second data frame, z=2. It is assumed that a sampling point sequence corresponding to the first pixel is $r_{x,y,z}(n)$, where n represents a sequence number of a sampling point in the sampling point sequence. A signal processing unit may search $r_{x,y,z}(n)$ for a candidate inflection point. For example, the first N inflection points may be preferentially selected in descending order of amplitudes or in ascending order of amplitudes. An inflection point selection rule is not limited in this application. A selected inflection point is used as a center to obtain a total of $N_{Truncate}$ sampling points (including the inflection point) on both sides of the inflection point to serve as a sampling point set, and the sampling point set is recorded as $w_{x,y,z,i}(m)$, where i represents a sequence number of an inflection point in the echo signal corresponding to the first pixel (x, y, z), $0<i\leq N$, m represents a sequence number of an $m^{th}$ sampling point in a sampling point set with an $i^{th}$ inflection point as a center, and $0<m \leq N_{Truncate}$. It is assumed that the radar records location information of the $i^{th}$ inflection point as $ip_{x,y,z}(i)$.

Optionally, the radar may estimate a signal-to-noise ratio of each sampling point set, and record the signal-to-noise ratio as $SNR_{x,y,z}(i)$. The radar may store information about each pixel in a form of a data block, or in other words, the information about each pixel is a data block. As described above, the information about each pixel includes at least one of the following: N sampling point sets in an echo signal corresponding to the pixel, location information of at least one inflection point in the N sampling point sets, the echo signal corresponding to the pixel, a signal-to-noise ratio of the echo signal corresponding to the pixel, a signal-to-noise ratio of a sampling point set in the echo signal, horizontal and vertical angles corresponding to the pixel, an actual distance between the radar and a target object, and other information.

Storage space of each data block can be reused. For example, it is assumed that a quantity of accumulated frames is M+1, information about any pixel included in the first M+1 data frames is stored in a form of a data block, and a quantity of pieces of storage space is M+1. For a data frame after the current data frame, according to a remainder method, information about pixels in the $1^{st}$ to $(M+1)^{th}$ data frames is respectively stored in the corresponding $1^{st}$ to $(M+1)^{th}$ data blocks, and information about pixels in the $(M+2)^{th}$ to $(2M+2)^{th}$ data frames respectively occupies storage space occupied by the information about the pixels in $1^{st}$ to $(M+1)^{th}$ data frames, and so on. In this way, data storage space is saved.

Step S202 is described as follows.

One sampling point set includes one inflection point. The radar may determine time information of the inflection point based on location information of the inflection point. The time information of the inflection point refers to a sum of a time for transmitting a signal to the inflection point and a time for reflected light of the target object to reach the radar. Assuming that a sampling rate of an ADC is 1 gigabit samples per second (GSPS), a sampling time is 1 nanosecond (ns). Because an inflection point includes 100 sampling points, time information of the inflection point is 1 ns*100=100 ns. Further, the radar may calculate a product of the time information of the inflection point and a speed of light to obtain a product result, and obtain an estimated distance between the radar and the target object by dividing the product result by 2.

Optionally, if a signal-to-noise ratio of the echo signal corresponding to the first pixel or a signal-to-noise ratio of at least one first sampling point set in the echo signal is less than a preset signal-to-noise ratio, the estimated distance between the radar and the target object is estimated based on each first sampling point set of the N sampling point sets, and the M cumulative receiving fields of view in a one-to-one correspondence with the M data frames are determined based on each estimated distance. On the contrary, there is no need to perform inter-frame pixel accumulation, or in other words, there is no need to perform steps S202 to S204.

In this application, the first sampling point set is any one of the N sampling point sets.

Optionally, if a signal-to-noise ratio of the echo signal corresponding to the first pixel or a signal-to-noise ratio of at least one first sampling point set in the echo signal is less than a preset signal-to-noise ratio, the radar may alternatively perform intra-frame pixel accumulation first, and then determine, for each first sampling point set, the M cumulative receiving fields of view corresponding to the M data frames received by the radar before the radar receives the current data frame.

In the foregoing process, a case in which only intra-frame pixel accumulation is performed is not included. Actually, the radar may set two preset signal-to-noise ratios: a first preset signal-to-noise ratio and a second preset signal-to-noise ratio, and the first preset signal-to-noise ratio is greater than the second preset signal-to-noise ratio. Based on this, if the signal-to-noise ratio of the echo signal corresponding to the first pixel or the signal-to-noise ratio of the at least one first sampling point set in the echo signal is greater than the first preset signal-to-noise ratio, intra-frame pixel accumulation and inter-frame pixel accumulation are not performed. If the signal-to-noise ratio of the echo signal corresponding to the first pixel or the signal-to-noise ratio of the at least one first sampling point set in the echo signal is less than or equal to the first preset signal-to-noise ratio and is greater than the second preset signal-to-noise ratio, intra-frame pixel accumulation is performed. If the signal-to-noise ratio of the echo signal corresponding to the first pixel or the signal-to-noise ratio of the at least one sampling point set in the echo signal is greater than or equal to the second preset signal-to-noise ratio, inter-frame pixel accumulation is performed. To be specific, the radar first determines, for the sampling point set, the M cumulative receiving fields of view corresponding to the M data frames received by the radar before the radar receives the current data frame.

It should be noted that the preset signal-to-noise ratio, the first preset signal-to-noise ratio, and the second preset signal-to-noise ratio may be determined based on radar testing, or may be an empirical value. This is not limited in this application.

Further, for each first sampling point set in the current data frame, the radar needs to determine M cumulative receiving fields of view corresponding to the first sampling point set. Each cumulative receiving field of view corresponding to the first sampling point set is a receiving field of view that corresponds to the first sampling point set and that is obtained by accumulation of the receiving field of view of the radar in the current data frame and a receiving field of view of the radar in a data frame before the current data frame. The cumulative receiving field of view is related to a sampling point set. For details, refer to the following several optional manners of step S202.

In addition, a principle for determining a cumulative receiving field of view by the radar is: The cumulative receiving field of view needs to include the first pixel and a neighboring pixel of the first pixel; and during determining of the cumulative receiving field of view, a relative motion speed between the radar and the target object needs to be considered, or a relative motion speed between the radar and the target object and a size of the target object need to be considered.

Based on this, the following describes two optional manners of step S202.

In an optional manner 1, FIG. 3 is a flowchart of a method for determining a cumulative receiving field of view according to an embodiment of this application. As shown in FIG. 3, the method includes the following steps.

Step S301: For each estimated distance, the radar determines a maximum horizontal movement angle value and a maximum vertical movement angle value of the target object for each estimated distance based on a maximum relative motion speed between the radar and the target object, a data frame period, the estimated distance, and a maximum horizontal angle of view, a total horizontal angle of view, a maximum vertical angle of view, and a total vertical angle of view that are of the radar.

Step S302: For each estimated distance, the radar determines a cumulative receiving field of view of the radar in any data frame based on a frame number difference i between the current data frame and the any data frame, a horizontal angle value and a vertical angle value of the first pixel, the maximum horizontal movement angle value of the target object, and the maximum vertical movement angle value of the target object, where 1≤i≤M, and i is an integer.

Step S301 is described as follows.

The method for determining a cumulative receiving field of view is described below by using "line spot transmitting and receiving" as an example. FIG. 4 is a schematic diagram of a correspondence between a relative motion speed, a distance, and a maximum horizontal movement angle value according to an embodiment of this application. As shown in FIG. 4, when a maximum relative motion speed Vmax between the radar and the target object is 120 km/h, and an estimated distance is 50 m, a data frame period Tf is 0.0333 seconds, a maximum horizontal angle of view of the radar is 60 degrees, a total horizontal angle of view of the radar is 120 degrees, that is, −60 degrees to 60 degrees, the target object moves in a direction perpendicular to an emission angle of 0 degrees, and a maximum horizontal movement angle value of the target object in the data frame period is 8. When a maximum relative motion speed between the radar and the target object is 120 km/h, and an estimated distance is 150 m, a data frame period Tf is 0.0333 seconds, a maximum horizontal angle of view of the radar is 60 degrees, a total horizontal angle of view of the radar is 120 degrees, the target object moves in a direction perpendicular to an emission angle of 0 degrees, and a maximum horizontal movement angle value of the target object in the data frame period is 3. Therefore, when the maximum relative motion speed between the radar and the target object is constant, a longer estimated distance leads to less impact of the maximum relative motion speed on the determining of a cumulative receiving field of view. On the contrary, a higher maximum relative motion speed has greater impact on the determining of a cumulative receiving field of view. Therefore, during determining of a cumulative receiving field of view in a plurality of frames, the signal processing unit needs to fully consider the maximum relative motion speed.

It is assumed that a maximum relative motion speed between the radar and the target object is Vmax, a data frame period is Tf, an estimated distance is d, a maximum horizontal angle of view of the radar is HFOV, a maximum vertical angle of view of the radar is VFOV, a total quantity of horizontal angles of the radar is NumHA, a total quantity of vertical angles of the radar is NumVA, a maximum horizontal movement angle value of the target object is HA(d), and a maximum vertical movement angle value of the target object is VA(d). The maximum horizontal movement angle value of the target object is a maximum movement angle value of the target object in a horizontal direction, and the maximum vertical movement angle value of the target object is a maximum movement angle value of the target object in a vertical direction.

The maximum horizontal movement angle value is $$HA(d) = \frac{V_{max} * T_f * NumHA}{2 * d * \tan HFOV}$$

-continued $$HA(d) = \frac{V_{max} * \tau_f * NumHA}{2 * d * \tan HFOV};$$

and the maximum vertical movement angle value is $$VA(d) = \frac{V_{max} * T_f * NumVA}{2 * d * \tan VFOV}.$$

Considering that a movement angle of the target in the vertical direction is relatively small, the maximum vertical movement angle value may be set based on experience.

Step S302 is described as follows.

In an implementation, the radar may determine the cumulative receiving field of view according to the following formula (1):

$$A=(h-HA(d)*i, h+HA(d)*i, v-VA(d)*, v+VA(d)*i),$$

where

A represents the cumulative receiving field of view of the radar in the any data frame, h−HA(d)*i represents a minimum horizontal angle value of A, h+HA(d)*i represents a maximum horizontal angle value of A, v−VA(d)*i represents a minimum vertical angle value of A, v+VA(d)*i represents a maximum vertical angle value of A, d represents an actual distance, HA(d) and VA(d) respectively represent the maximum horizontal movement angle value of the target object and the maximum vertical movement angle value of the target object, h represents the horizontal angle value of the first pixel, and v represents the vertical angle value of the first pixel.

The method for determining a cumulative receiving field of view is described below by using "line spot transmitting and receiving" as an example. Assuming that a maximum relative motion speed Vmax between the radar and the target object is 120 km/h, a data frame period Tf is 0.0333 seconds, a frame number difference between the current data frame and a previous data frame is i, an estimated distance d belongs to a distance interval 50-70 m, a maximum horizontal movement angle value of the target object is 8, a minimum horizontal angle value of a cumulative receiving field of view is h−8*i, and a maximum horizontal angle value of the cumulative receiving field of view is h+8*i. In a vertical direction, because the data frame period is relatively short, relative motion between the radar and the target object has less impact on the determining of the cumulative receiving field of view. Therefore, it may be assumed that in cases of all different estimated distances, a minimum vertical angle value of the cumulative receiving field of view is v−2*i, and a maximum vertical angle value of the cumulative receiving field of view is v+2*i. Based on this, the finally determined cumulative receiving field of view is (h−8*i,h+8*i,v−2*,v+2*i).

In another implementation, before step S302, the radar may further obtain a size of the target object, where the size of the target object may be measured by horizontal and vertical angles of the target object.

Correspondingly, the radar may determine the cumulative receiving field of view of the radar in the any data frame based on the frame number difference i between the current data frame and the any data frame, the horizontal angle value and the vertical angle value of the first pixel, the maximum horizontal movement angle value of the target object, the maximum vertical movement angle value of the target object, and the size of the target object. For example, the signal processing unit determines the cumulative receiving field of view according to the following formula (2):

$$A\left(h - \text{int}\left(\frac{TH-1}{2}\right) - HA(d)*i, h + \text{int}\left(\frac{TH-1}{2}\right) + \right. \quad (2)$$
$$\left. HA(d)*i, v - \text{int}\left(\frac{TV-1}{2}\right) - VA(d)*i, v + \text{int}\left(\frac{TV-1}{2}\right) + VA(d)*i\right),$$

where
A represents the cumulative receiving field of view of the radar in the any data frame, h−HA(d)*i represents a minimum horizontal angle value of A, h+HA(d)*i represents a maximum horizontal angle value of A, v−VA(d)*i represents a minimum vertical angle value of A, v+VA(d)*i represents a maximum vertical angle value of A, d represents the estimated distance, HA(d) and VA(d) respectively represent the maximum horizontal movement angle value of the target object and the maximum vertical movement angle value of the target object, h represents the horizontal angle value of the first pixel, v represents the vertical angle value of the first pixel, and TH and TV respectively represent a horizontal angle value and a vertical angle value of the target object; and int( ) represents a rounding function, where the rounding function may be a rounding up function or a rounding down function.

The method for determining a cumulative receiving field of view is described below by using "line spot transmitting and receiving" as an example. It is assumed that a maximum relative motion speed Vmax between the radar and the target object is 120 km/h, a data frame period Tf is 0.0333 seconds, a frame number difference between the current data frame and a previous data frame is i, an estimated distance d belongs to a distance interval 50-70 m, and a maximum horizontal movement angle value of the target object is 8. In a vertical direction, because the data frame period is relatively short, relative motion between the radar and the target object has less impact on the determining of the cumulative receiving field of view. Therefore, it may be assumed that a maximum vertical movement angle value of the target object is 2. Considering impact of the size of the target object on the determining of the cumulative receiving field of view, it is assumed that a horizontal angle value TH of the target object is 7 and a vertical angle value TV of the target object is 5. Based on this, a minimum horizontal angle value of the cumulative receiving field of view determined by the signal processing unit is h−3−8*i, a minimum horizontal angle value of the cumulative receiving field of view is h+3+8*i, a minimum horizontal angle value of the cumulative receiving field of view is v−2−2*i, and a maximum horizontal angle value of the cumulative receiving field of view is v+2+2*i. Based on this, the finally determined cumulative receiving field of view is (h−3−8*i,h+3+8*i,v−2−2*,v+2+2*i).

In an optional manner 2, for each estimated distance, if the estimated distance falls within a target distance interval, and the target distance interval corresponds to a cumulative receiving field of view, the radar uses the cumulative receiving field of view corresponding to the target distance interval as a cumulative receiving field of view of the radar in any one of the M data frames.

One sampling point set includes one inflection point. The radar may determine time information of the inflection point based on location information of the inflection point, calculate a product of the time information and a speed of light to obtain a product result, and obtain an estimated distance between the radar and the target object by dividing the product result by 2.

The radar may set different cumulative receiving fields of view for different distance intervals. For details thereof, refer to Table 1. For any distance interval, the radar selects a maximum horizontal movement angle value of the target object and a maximum vertical movement angle value of the target object that correspond to a maximum distance in the distance interval. A maximum horizontal movement angle value that is of the target object and that corresponds to a $j^{th}$ distance interval may be denoted as HAjmax, and a maximum vertical movement angle value that is of the target object and that corresponds to the $j^{th}$ distance interval may be denoted as VAjmax.

TABLE 1

| Distance interval (meter) | Cumulative receiving field of view of the radar in a data frame before a current data frame (herein, it is assumed that a relative motion speed between the radar and the target object and the size of the target object are considered), where a frame number difference between the current data frame and the data frame is i. |
|---|---|
| 0-$d_1$ | $A\left(h - \text{int}\left(\frac{TH-1}{2}\right) - HA1\text{max}*i, h + \text{int}\left(\frac{TH-1}{2}\right) + HA1\text{max}*i, v - \text{int}\left(\frac{TV-1}{2}\right) - VA1\text{max}*i, v + \text{int}\left(\frac{TV-1}{2}\right) + VA1\text{max}*i\right)$ |
| $d_1$-$d_2$ | $A\left(h - \text{int}\left(\frac{TH-1}{2}\right) - HA2\text{max}*i, h + \text{int}\left(\frac{TH-1}{2}\right) + HA2\text{max}*i, v - \text{int}\left(\frac{TV-1}{2}\right) - VA2\text{max}*i, v + \text{int}\left(\frac{TV-1}{2}\right) + VA2\text{max}*i\right)$ |
| $d_3$-$d_4$ | $A\left(h - \text{int}\left(\frac{TH-1}{2}\right) - HA3\text{max}*i, h + \text{int}\left(\frac{TH-1}{2}\right) + HA3\text{max}*i, v - \text{int}\left(\frac{TV-1}{2}\right) - VA3\text{max}*i, v + \text{int}\left(\frac{TV-1}{2}\right) + VA3\text{max}*i\right)$ |
| $d_5$-$d_6$ | $A\left(h - \text{int}\left(\frac{TH-1}{2}\right) - HA4\text{max}*i, h + \text{int}\left(\frac{TH-1}{2}\right) + HA4\text{max}*i, v - \text{int}\left(\frac{TV-1}{2}\right) - VA4\text{max}*i, v + \text{int}\left(\frac{TV-1}{2}\right) + VA4\text{max}*i\right)$ |
| . . . | . . . |

It should be noted that, in Table 1, the radar sets the corresponding cumulative receiving field of view for the distance interval 0-d1. Actually, the radar may not set a cumulative receiving field of view for the distance interval 0-d1. Alternatively, the radar selects a maximum horizontal movement angle value of the target object and a maximum vertical movement angle value of the target object that correspond to any distance (which is not limited to a maximum distance) in the distance interval, and sets a cumulative receiving field of view based on the maximum horizontal movement angle value of the target object and the maximum vertical movement angle value of the target object. Alternatively, the radar may use a cumulative receiving field of view corresponding to another distance interval as the cumulative receiving field of view corresponding to the distance interval 0-d1. Certainly, the cumulative receiving field of view corresponding to the another distance interval may also be determined by using the method for determining the cumulative receiving field of view corresponding to the distance interval 0-d1. Details are not described again in this application.

Table 2 lists cumulative receiving fields of view that correspond to different actual distance intervals and that are determined by the radar in a case in which a scanning mode in line spot transmitting and receiving is used.

TABLE 2

| Distance interval (meter) | Cumulative receiving field of view of the radar in a data frame before a current data frame (herein, it is assumed that a relative motion speed between the radar and the target object and the size of the target object are considered), where a frame number difference between the current data frame and the data frame is i. |
|---|---|
| 0-50 | $A(h - 3 - 6 * i, h + 3 + 6 * i, v - 2 - 2 * i, v + 2 + 2 * i)$ |
| 50-70 | $A(h - 3 - 8 * i, h + 3 + 8 * i, v - 2 - 2 * i, v + 2 + 2 * i)$ |
| 70-100 | $A(h - 3 - 6 * i, h + 3 + 6 * i, v - 2 - 2 * i, v + 2 + 2 * i)$ |
| 100-150 | $A(h - 3 - 4 * i, h + 3 + 4 * i, v - 2 - 2 * i, v + 2 + 2 * i)$ |
| 150-200 | $A(h - 3 - 3 * i, h + 3 + 3 * i, v - 2 - 2 * i, v + 2 + 2 * i)$ |
| >200 | $A(h - 3 - 2 * i, h + 3 + 2 * i, v - 2 - 2 * i, v + 2 + 2 * i)$ |

When the foregoing estimated distance is less than 50 m, a signal-to-noise ratio of the echo signal is usually relatively high. Therefore, the radar may alternatively determine a cumulative receiving field of view without using Table 2, that is, without using an inter-frame pixel signal multiplexing method. Alternatively, the radar may select a cumulative receiving field of view corresponding to another distance interval as a cumulative receiving field of view corresponding to 50 m. Alternatively, a cumulative receiving field of view corresponding to any distance in a distance interval 0-50 m, for example, 30 m, is selected.

Further, the foregoing target distance interval may be preset. For example, the target distance interval is a distance interval in Table 1.

Figure 5:
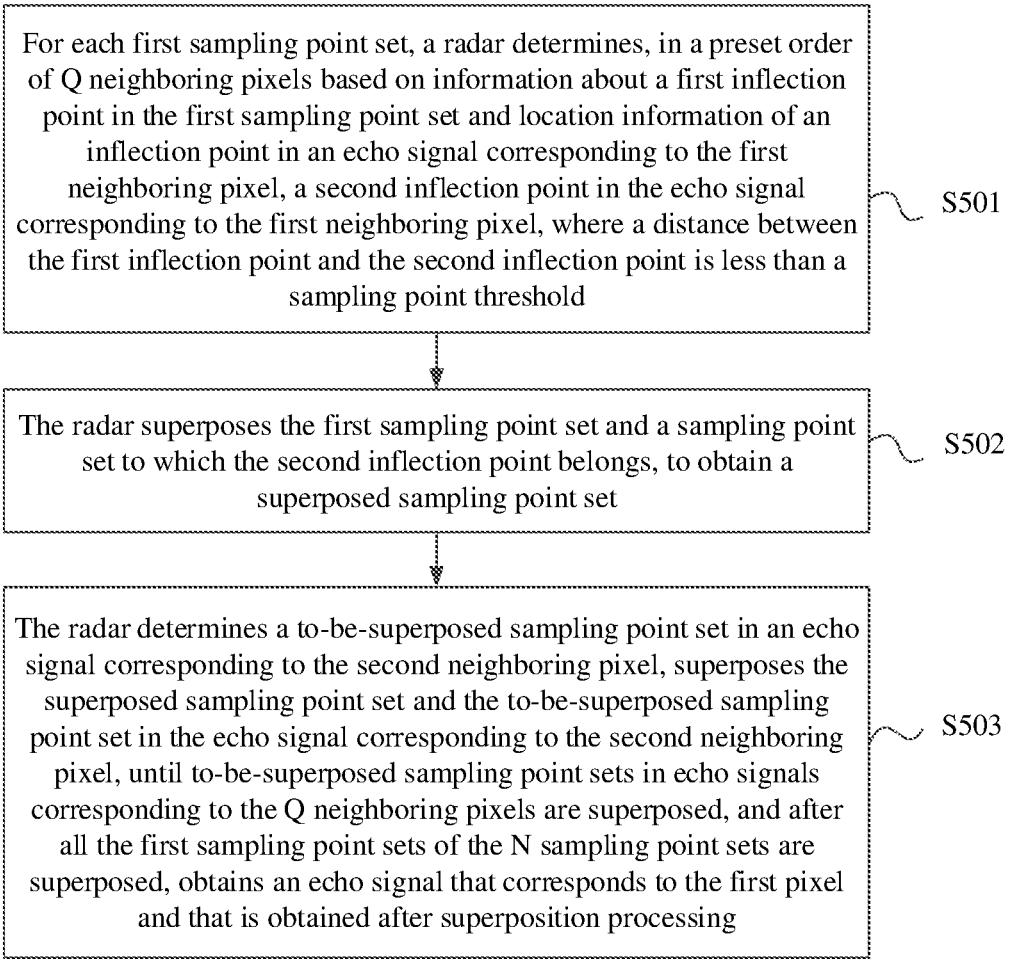
FIG. 5 is a flowchart of a method for obtaining an echo signal that corresponds to a first pixel and that is obtained after superposition processing according to an embodiment of this application.

Step S203 is described as follows:

In an optional manner 1, FIG. 5 is a flowchart of a method for obtaining an echo signal that corresponds to a first pixel and that is obtained after superposition processing according to an embodiment of this application. As shown in FIG. 5, the method includes the following steps.

Step S501: For each first sampling point set, the radar determines, in a preset order of the Q neighboring pixels based on information about a first inflection point in the first sampling point set and location information of an inflection point in an echo signal corresponding to the first neighboring pixel, a second inflection point in the echo signal corresponding to the first neighboring pixel, where a distance between the first inflection point and the second inflection point is less than a sampling point threshold.

Step S502: The radar superposes the first sampling point set and a sampling point set to which the second inflection point belongs, to obtain a superposed sampling point set.

Step S503: The radar determines a to-be-superposed sampling point set in an echo signal corresponding to the second neighboring pixel, superposes the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtains the echo signal that corresponds to the first pixel and that is obtained after superposition processing.

Specifically, a neighboring pixel of the first pixel is a pixel adjacent to the first pixel. For example, the neighboring pixel of the first pixel includes at least one of the following: a neighboring pixel above the first pixel, a neighboring pixel below the first pixel, a neighboring pixel on a left side of the first pixel, a neighboring pixel on a right side of the first pixel, a neighboring pixel on an upper left side of the first pixel, a neighboring pixel on a lower left side of the first pixel, a neighboring pixel on an upper right side of the first pixel, and a neighboring pixel on a lower right side of the first pixel in a cumulative receiving field of view.

Optionally, the preset order of the Q neighboring pixels is: a neighboring pixel above the first pixel, a neighboring pixel above the first pixel, a neighboring pixel on the upper right side of the first pixel, a neighboring pixel on the right side of the first pixel, a neighboring pixel below the first pixel, a neighboring pixel on the lower left side of the first pixel, and a neighboring pixel on the left side of the first pixel. Optionally, the preset order of the Q neighboring pixels is: a neighboring pixel on the left side of the first pixel, a neighboring pixel on the lower left side of the first pixel, a neighboring pixel below the first pixel, a neighboring pixel on the right side of the first pixel, a neighboring pixel on the upper right side of the first pixel, a neighboring pixel above the first pixel, and a neighboring pixel above the first pixel. Alternatively, the preset order of the Q neighboring pixels is a descending order of echo signals corresponding to the Q neighboring pixels, or the preset order of the Q neighboring pixels is an ascending order of echo signals corresponding to the Q neighboring pixels. In a word, the preset order of the Q neighboring pixels is not limited in this application.

Further, for each first sampling point set, the radar performs the following operations: After the radar determines the preset order of the Q neighboring pixels, the radar first obtains location information of the first inflection point in the echo signal corresponding to the first neighboring pixel, and determines a distance between the first inflection point and the foregoing first inflection point (an inflection point in a current sampling point set in the echo signal corresponding to the first pixel), where if the distance between the two inflection points is less than the sampling point threshold, the first inflection point is the foregoing second inflection point; and the radar superposes the first sampling point set and the sampling point set to which the second inflection point belongs, to obtain the superposed sampling point set. For the current sampling point set in the echo signal corresponding to the first pixel, there is usually one to-besuperposed sampling point set in an echo signal corresponding to one neighboring pixel. Therefore, after superposing the sampling point set for the first neighboring pixel, the radar continues to determine a to-be-superposed sampling point set in an echo signal corresponding to the second neighboring pixel, and superposes the superposed sampling point set and the to-be-superposed sampling point set in the echo signal corresponding to the second neighboring pixel, until a to-be-superposed sampling point set in an echo signal corresponding to the $Q^{th}$ neighboring pixel is superposed. After all the first sampling point sets of the N sampling point sets are superposed, the radar obtains the echo signal that corresponds to the first pixel and that is obtained after superposition processing.

It is assumed that the first pixel is (x, y, z) and the neighboring pixel of the first pixel is (x, y+1, z−1). For a current first sampling point set of the N sampling point sets corresponding to the first pixel, sampling point sets are searched for one by one in an echo signal corresponding to the neighboring pixel (x, y+1, z−1). In addition, assuming that location information of an inflection point in the current first sampling point set is $ip_{x,y,z}(i)$, location information of an inflection point in a $j^{th}$ sampling point set in the echo signal corresponding to the neighboring pixel (x, y+1, z−1) is $ip_{x,y+1,z-1}(j)$, and the sampling point threshold is inter_thr, whether the following formula (3) holds true is determined. If the following formula (3) holds true, the radar superposes the current first sampling point set and the $j^{th}$ sampling point set; or otherwise, the radar does not superpose the current first sampling point set and the $j^{th}$ sampling point set.

$$|ip_{x,y+1,z-1}(j) - ip_{x,y,z}(i)| \leq \text{inter\_thr} \quad (3)$$

Figure 6:
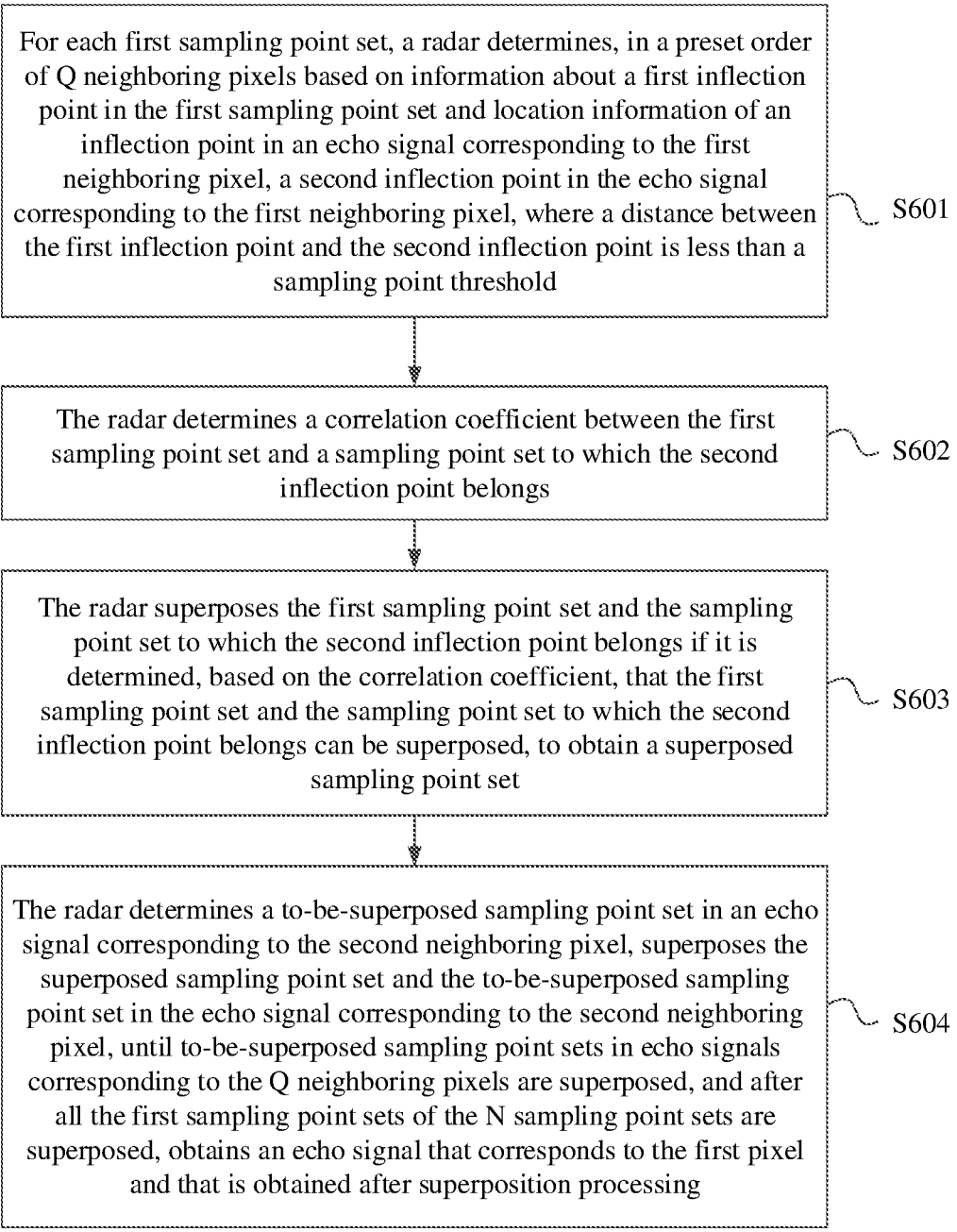
FIG. 6 is a flowchart of a method for obtaining an echo signal that corresponds to a first pixel and that is obtained after superposition processing according to another embodiment of this application.

In an optional manner 2, FIG. 6 is a flowchart of a method for obtaining an echo signal that corresponds to a first pixel and that is obtained after superposition processing according to another embodiment of this application. As shown in FIG. 6, the method includes the following steps.

Step S601: For each first sampling point set, the radar determines, in a preset order of the Q neighboring pixels based on information about a first inflection point in the first sampling point set and location information of an inflection point in an echo signal corresponding to the first neighboring pixel, a second inflection point in the echo signal corresponding to the first neighboring pixel, where a distance between the first inflection point and the second inflection point is less than a sampling point threshold.

Step S602: The radar determines a correlation coefficient between the first sampling point set and a sampling point set to which the second inflection point belongs.

Step S603: The radar superposes the first sampling point set and the sampling point set to which the second inflection point belongs if it is determined, based on the correlation coefficient, that the first sampling point set and the sampling point set to which the second inflection point belongs can be superposed, to obtain a superposed sampling point set.

Step S604: The radar determines a to-be-superposed sampling point set in an echo signal corresponding to the second neighboring pixel, superposes the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtains the echo signal that corresponds to the first pixel and that is obtained after superposition processing.

For definitions of a neighboring pixel of the first pixel and the preset order of the Q neighboring pixels, refer to the content in the foregoing optional manner 1. Details are not described again.

Further, for each first sampling point set, the radar performs the following operations: After the radar determines the preset order of the Q neighboring pixels, the radar first obtains location information of the first inflection point in the echo signal corresponding to the first neighboring pixel, and determines a distance between the first inflection point and the foregoing first inflection point (an inflection point in a current first sampling point set in the echo signal corresponding to the first pixel), where if the distance between the two inflection points is less than the sampling point threshold, the first inflection point is the foregoing second inflection point; and the radar determines the following correlation coefficient $r(w_{x,y,z,i}(n), w_{x,y+1,z-1,j}(n))$ between the sampling point set $w_{x,y,z,i}(n)$ and the sampling point set $w_{x,y+1,z-1,j}(n)$ to which the second inflection point belongs:

$$r(w_{x,y,z,i}(n), w_{x,y+1,z-1,j}(n)) = \frac{\text{Cov}(w_{x,y,z,i}(n), w_{x,y+1,z-1,j}(n))}{\sqrt{\text{Var}(w_{x,y,z,i}(n))\text{Var}(w_{x,y+1,z-1,j}(n))}} =$$

$$\frac{\sum_{n=1}^{N_{Truncate}} (w_{x,y,z,i}(n) - \overline{w_{x,y,z,i}(n)})(w_{x,y+1,z-1,j}(n) - \overline{w_{x,y+1,z-1,j}(n)})}{\sqrt{\sum_{n=1}^{N_{Truncate}} (w_{x,y,z,i}(n) - \overline{w_{x,y,z,i}(n)})^2} \sqrt{\sum_{n=1}^{N_{Truncate}} (w_{x,y+1,z-1,j}(n) - \overline{w_{x,y+1,z-1,j}(n)})^2}}$$

where $\text{Cov}(w_{x,y,z,i}(n), w_{x,y+1,z-1,j}(n))$ is a covariance between $w_{x,y,z,i}(n)$ and $w_{x,y+1,z-1,j}(n)$, $\text{Var}(w_{x,y,z,i}(n))$ is a variance of $w_{x,y,z,i}(n)$, $\text{Var}(w_{x,y+1,z-1,j}(n))$ is a variance of $w_{x,y+1,z-1,j}(n)$, and $N_{Truncate}$ is a quantity of sampling points included in a sampling point set. To be specific, in an example, $N_{Truncate}=2*M+1$, $\overline{w_{x,y,z,i}(n)}$ represents an average value of $w_{x,y,z,i}(n)$, and $\overline{w_{x,y+1,z-1,j}(n)}$ represents an average value of $w_{x,y+1,z-1,j}(n)$.

If the correlation coefficient is greater than a preset threshold, it is determined that the first sampling point set and the sampling point set to which the second inflection point belongs can be superposed; and the first sampling point set and the sampling point set to which the second inflection point belongs are superposed to obtain the superposed sampling point set. The preset threshold may be a preset fixed value, or may be determined based on a signal-to-noise ratio of the first sampling point set or an echo signal, or may be determined based on the actual distance between the radar and the target object. Further, the radar determines the to-be-superposed sampling point set in the echo signal corresponding to the second neighboring pixel (the radar determines the to-be-superposed sampling point set by using the method for determining the to-be-superposed sampling point set for the first neighboring pixel. To be specific, the radar first determines a second inflection point for the second neighboring pixel, and determines a correlation coefficient between the first sampling point set and a sampling point set to which the second inflection point corresponding to the second neighboring pixel belongs; if the correlation coefficient is greater than the preset threshold, determines that the first sampling point set and the sampling point set to which the second inflection point belongs can be superposed, and superposes the first sampling point set and the sampling point set to which the second inflection point belongs to obtain a superposed sampling point set), superposes the superposed sampling point set and the to-be-superposed sampling point set in the echo signal corresponding to the second neighboring pixel, until a to-be-superposed sampling point set in an echo signal corresponding to a $Q'h$ neighboring pixel is superposed, and after all the first sampling point sets of the N sampling point sets are superposed, obtains the echo signal that corresponds to the first pixel and that is obtained after superposition processing.

Alternatively, after the radar determines the preset order of the Q neighboring pixels, the radar first obtains location information of the first inflection point in the echo signal corresponding to the first neighboring pixel, and determines a distance between the first inflection point and the foregoing first inflection point (an inflection point in a current first sampling point set in the echo signal corresponding to the first pixel), where if the distance between the two inflection points is less than the sampling point threshold, the first inflection point is the second inflection point; and the radar determines the correlation coefficient between the first sampling point set and the sampling point set to which the second inflection point belongs, and if the correlation coefficient is greater than a preset threshold, obtains an attribute value of the echo signal corresponding to the first pixel and an attribute value of the echo signal corresponding to the first neighboring pixel, where the attribute value includes any one of the following: a signal amplitude, a peak-to-average ratio, or a signal-to-noise ratio. If the attribute value of the echo signal corresponding to the first pixel and the attribute value of the echo signal corresponding to the first neighboring pixel satisfy a preset condition, the radar determines that the first sampling point set and the sampling point set to which the second inflection point belongs can be superposed, and superposes the first sampling point set and the sampling point set to which the second inflection point belongs, to obtain a superposed sampling point set. The preset threshold may be a preset fixed value, may be determined based on a signal-to-noise ratio, or may be determined based on a parameter such as a distance or a reflectivity. Further, the radar determines a to-be-superposed sampling point set in an echo signal corresponding to the second neighboring pixel, superposes the superposed sampling point set and the to-be-superposed sampling point set in the echo signal corresponding to the second neighboring pixel, until a to-be-superposed sampling point set in an echo signal corresponding to a $Q^{th}$ neighboring pixel is superposed, and after all the first sampling point sets of the N sampling point sets are superposed, obtains the echo signal that corresponds to the first pixel and that is obtained after superposition processing.

The foregoing preset condition may be as follows.

For the attribute value of the echo signal corresponding to the first neighboring pixel, the preset condition is that a weighted average value of the attribute value of the echo signal corresponding to the first pixel and the attribute value of the echo signal corresponding to the first neighboring pixel is greater than the attribute value of the echo signal corresponding to the first pixel. An attribute value of a pixel may include at least one of the following: an amplitude, a signal-to-noise ratio, and a peak ratio of an echo signal corresponding to the pixel. For example, an attribute value of a pixel is an amplitude of an echo signal corresponding to the pixel. Assuming that an amplitude of the echo signal corresponding to the first pixel is A0, and an amplitude of the echo signal corresponding to the first neighboring pixel is A1, the preset condition may be expressed by using the following formula (4):

$$(A0+A1)/\sqrt{2} > A0 \tag{4}$$

For an attribute value of the echo signal corresponding to the second neighboring pixel, the preset condition is that a weighted average value of the attribute value of the echo signal corresponding to the first pixel, the attribute value of the echo signal corresponding to the first neighboring pixel, and the attribute value of the echo signal corresponding to the second neighboring pixel is greater than the attribute value of the echo signal corresponding to the first pixel. For example, an attribute value of a pixel is an amplitude of an echo signal corresponding to the pixel. Assuming that an amplitude of the echo signal corresponding to the first pixel is A0, an amplitude of the echo signal corresponding to the first neighboring pixel is A1, and an amplitude of the echo signal corresponding to second first neighboring pixel is A1, the preset condition may be expressed by using the following formula (5):

$$(A0+A1+A2)/\sqrt{3} > A0 \tag{5}$$

By analogy, for an attribute value of an echo signal corresponding to the $i^{th}$ neighboring pixel, a preset condition corresponding to the attribute value may be expressed by using the following formula (6):

$$(A0+A1+\ldots+Ai)/\sqrt{i+1} > A0 \tag{6}$$

Alternatively, the foregoing preset condition may be as follows.

For an attribute value of an echo signal corresponding to any neighboring pixel, the preset condition is that the attribute value of the echo signal corresponding to the neighboring pixel is greater than a preset multiple of the attribute value of the echo signal corresponding to the first pixel. The preset multiple may be any real number between $\sqrt{2}$ and 1.

It should be noted that, the sampling point thresholds in the foregoing two optional manners of step S203 may be obtained by using the following method.

Figure 7:
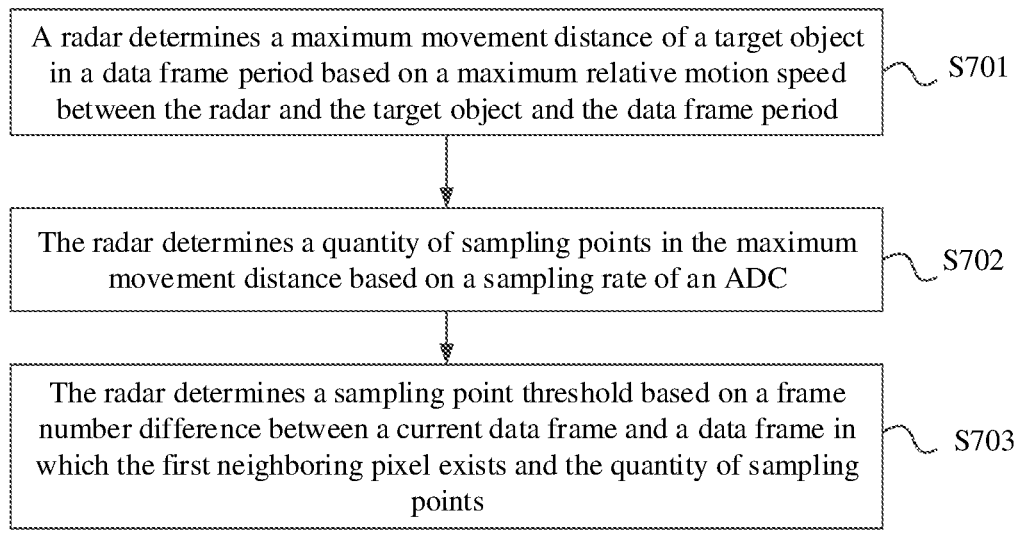
FIG. 7 is a flowchart of a method for determining a sampling point threshold according to an embodiment of this application.

FIG. 7 is a flowchart of a method for determining a sampling point threshold according to an embodiment of this application. The method is performed by a signal processing unit in a radar. As shown in FIG. 7, the radar includes an ADC. Based on this, as shown in FIG. 7, the method includes the following steps.

Step S701: The radar determines a maximum movement distance of a target object in a data frame period based on a maximum relative motion speed between the radar and the target object and the data frame period.

Step S702: The radar determines a quantity of sampling points in the maximum movement distance based on a sampling rate of the ADC.

Step S703: The radar determines a sampling point threshold based on a frame number difference between a current data frame and a data frame in which the first neighboring pixel exists and the quantity of sampling points.

Specifically, assuming that the maximum relative motion speed between the radar and the target object is Vmax and a data frame period is Tf, it is determined that the maximum movement distance of the target object in the data frame period is Vmax*Tf. It is assumed that the radar determines, based on the sampling rate of the ADC, that the quantity of sampling points in the maximum movement distance is sa. Further, assuming that the radar determines that the frame number difference between the current data frame and the data frame in which the first neighboring pixel exists is m, and assuming that an allowable error is deta, a finally determined sampling point threshold is deta+sa*m.

For example, assuming that the relative motion speed Vmax between the radar and the target object is 120 km/h, the data frame period Tf is 0.0333 s, and the sampling rate of the ADC is 1 GSPS, the maximum movement distance of the target object in a cumulative receiving field of view in the data frame period is 1.111 m. If the target object moves in a direction towards or away from an emission angle of 0 degrees of the radar, the quantity sa of sampling points in the maximum movement distance is 8. Assuming that the frame number difference between the current data frame and the data frame in which the first neighboring pixel exists is m, and assuming that the allowable error deta is four sampling points, the finally determined sampling point threshold is 4+8*m sampling points.

It should be noted that, for each first sampling point set in the echo signal corresponding to the first pixel, a quantity of times of superposition on the first sampling point set may be determined; and after sampling point sets corresponding to Q neighboring pixels are superposed, a superposition result may be divided by the quantity of times of superposition.

For step S204, the following description is provided: The radar may use but not limited to a single echo distance calculation mode and a multi-echo distance calculation mode, including but not limited to detection methods such as a peak detection method, a leading edge identification method, a centroid method, and a Gaussian decomposition method.

To sum up, this application provides the echo signal processing method. The radar may determine the M cumulative receiving fields of view based on each first sampling point set of the N sampling point sets. The radar determines, in the echo signals corresponding to the Q neighboring pixels in the M cumulative receiving fields of view, a to-be-superposed sampling point set corresponding to the first sampling point set, superposes the first sampling point set and the to-be-superposed sampling point set corresponding to the first sampling point set, and after superposing all the first sampling point sets of the N sampling point sets, obtains the echo signal that corresponds to the first pixel and that is obtained after superposition processing; and calculates the actual distance between the radar and the target object based on the echo signal obtained after superposition processing. In this application, considering a correlation to an object in space, the detector in the radar receives, at one angle and adjacent angles and in pixels in a plurality of adjacent data frames, echo signals whose pulse locations and amplitudes are close to each other. Therefore, when a signal-to-noise ratio of an echo signal is relatively low, inter-frame signal multiplexing is implemented to increase the signal-to-noise ratio of the echo signal, thereby improving ranging accuracy.

Further, impact of the motion of the target object is also considered in this application. Therefore, this application is applicable to static and motion scenarios and the like of the target object, and is applicable to light detection and ranging in "line spot transmitting and receiving", "plane spot transmitting and receiving", "point spot transmitting and receiving", and the like.

Figure 8:
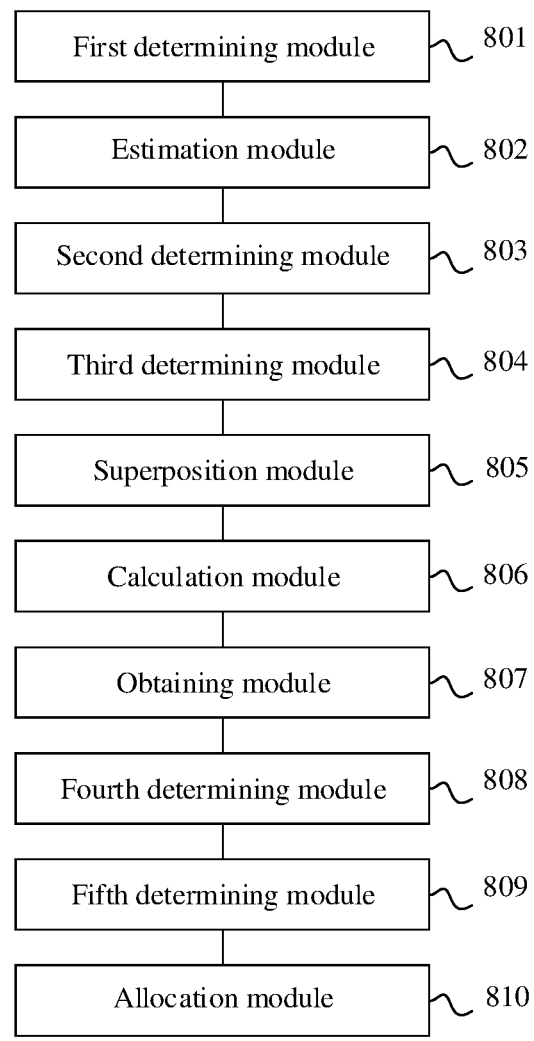
FIG. 8 is a schematic diagram of a structure of an echo signal processing apparatus according to an embodiment of this application.

FIG. 8 is a schematic diagram of a structure of an echo signal processing apparatus according to an embodiment of this application. The echo signal processing apparatus may be a part of a radar or the entire radar. For example, the apparatus may be a signal processing unit, that is, a processor, of the radar. As shown in FIG. 8, the apparatus includes:

a first determining module 801, configured to determine, in a current data frame, a first pixel in a receiving field of view of a radar and N sampling point sets in an echo signal corresponding to the first pixel, where N is an integer greater than or equal to 1, and the first pixel is any pixel in the receiving field of view; an estimation module 802, configured to estimate an estimated distance between the radar and a target object based on each first sampling point set of the N sampling point sets; a second determining module 803, configured to determine, based on each estimated distance, M cumulative receiving fields of view in a one-to-one correspondence with M data frames, where each of the M cumulative receiving fields of view includes at least one neighboring pixel of the first pixel, the M data frames are M data frames received by the radar before the radar receives the current data frame, M is an integer greater than or equal to 1, and the first sampling point set is any one of the N sampling point sets; a third determining module 804, configured to determine, based on each first sampling point set, a second sampling point set in echo signals corresponding to Q neighboring pixels in the M cumulative receiving fields of view; a superposition module 805, configured to superpose each first sampling point set and the corresponding second sampling point set to obtain an echo signal that corresponds to the first pixel and that is obtained after superposition processing, where Q is an integer greater than or equal to 1; and a calculation module 806, configured to calculate an actual distance between the radar and the target object based on the echo signal that corresponds to the first pixel and that is obtained after superposition processing.

Optionally, the estimation module 802 is specifically configured to determine the estimated distance between the radar and the target object based on location information of an inflection point in each first sampling point set of the N sampling point sets.

Optionally, the second determining module 803 is specifically configured to: determine a maximum horizontal movement angle value and a maximum vertical movement angle value of the target object for each estimated distance based on a maximum relative motion speed between the radar and the target object, a data frame period, the estimated distance, and a maximum horizontal angle of view, a total horizontal angle of view, a maximum vertical angle of view, and a total vertical angle of view that are of the radar; and determine a cumulative receiving field of view of the radar in any data frame based on a frame number difference i between the current data frame and the any data frame, a horizontal angle value and a vertical angle value of the first pixel, the maximum horizontal movement angle value of the target object, and the maximum vertical movement angle value of the target object, where i≤i≤M, and i is an integer.

Optionally, the second determining module 803 is specifically configured to determine the cumulative receiving field of view of the radar in the any data frame according to the following formula:

$$A=(h-\text{HA}(d)*i, h+\text{HA}(d)*i, v-\text{VA}(d)*, v+\text{VA}(d)*i),$$

where

A represents the cumulative receiving field of view of the radar in the any data frame, $h-\text{HA}(d)*i$ represents a minimum horizontal angle value of A, $h+\text{HA}(d)*i$ represents a maximum horizontal angle value of A, $v-\text{VA}(d)*i$ represents a minimum vertical angle value of A, $v+\text{VA}(d)*i$ represents a maximum vertical angle value of A, d represents the estimated distance, HA(d) and VA(d) respectively represent the maximum horizontal movement angle value of the target object and the maximum vertical movement angle value of the target object, h represents the horizontal angle value of the first pixel, and v represents the vertical angle value of the first pixel.

Optionally, the apparatus further includes an obtaining module 807, configured to obtain a size of the target object.

Correspondingly, the second determining module 803 is specifically configured to determine the cumulative receiving field of view of the radar in the any data frame based on the frame number difference i between the current data frame and the any data frame, the horizontal angle value and the vertical angle value of the first pixel, the maximum horizontal movement angle value of the target object, the maximum vertical movement angle value of the target object, and the size of the target object.

Optionally, the second determining module 803 is specifically configured to determine the cumulative receiving field of view of the radar in the any data frame according to the following formula:

$$A = \left(h - \operatorname{int}\left(\frac{TH-1}{2}\right) - HA(d)*i, h + \operatorname{int}\left(\frac{TH-1}{2}\right) + \right.$$
$$\left. HA(d)*i, v - \operatorname{int}\left(\frac{TV-1}{2}\right) - VA(d)*i, v + \operatorname{int}\left(\frac{TV-1}{2}\right) + VA(d)*i\right),$$

where
- A represents the cumulative receiving field of view of the radar in the any data frame, h−HA(d)*i represents a minimum horizontal angle value of A, h+HA(d)*i represents a maximum horizontal angle value of A, v−VA(d)*i represents a minimum vertical angle value of A, v+VA(d)*i represents a maximum vertical angle value of A, d represents the estimated distance, HA(d) and VA(d) respectively represent the maximum horizontal movement angle value of the target object and the maximum vertical movement angle value of the target object, h represents the horizontal angle value of the first pixel, v represents the vertical angle value of the first pixel, and TH and TV respectively represent a horizontal angle value and a vertical angle value of the target object.

Optionally, the second determining module 803 is specifically configured to: for each estimated distance, if the estimated distance falls within a target distance interval, and the target distance interval corresponds to a cumulative receiving field of view, use the cumulative receiving field of view corresponding to the target distance interval as a cumulative receiving field of view of the radar in any data frame.

Optionally, the apparatus further includes a fourth determining module 808, configured to determine a signal-to-noise ratio of the echo signal corresponding to the first pixel or a signal-to-noise ratio of at least one first sampling point set. Correspondingly, the second determining module 803 is specifically configured to: if the signal-to-noise ratio of the echo signal corresponding to the first pixel or the signal-to-noise ratio of the at least one first sampling point set is less than a preset signal-to-noise ratio, estimate the estimated distance between the radar and the target object based on each first sampling point set of the N sampling point sets, and determine, based on each estimated distance, the M cumulative receiving fields of view in a one-to-one correspondence with the M data frames.

Optionally, the superposition module 805 is specifically configured to: for each first sampling point set, determine, in a preset order of the Q neighboring pixels based on information about a first inflection point in the first sampling point set and location information of an inflection point in an echo signal corresponding to the first neighboring pixel, a second inflection point in the echo signal corresponding to the first neighboring pixel, where a distance between the first inflection point and the second inflection point is less than a sampling point threshold; superpose the first sampling point set and a sampling point set to which the second inflection point belongs, to obtain a superposed sampling point set; and determine a to-be-superposed sampling point set in an echo signal corresponding to the second neighboring pixel, superpose the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtain the echo signal that corresponds to the first pixel and that is obtained after superposition processing.

Optionally, the superposition module 805 is specifically configured to: for each first sampling point set, determine, in a preset order of the Q neighboring pixels based on information about a first inflection point in the first sampling point set and location information of an inflection point in an echo signal corresponding to the first neighboring pixel, a second inflection point in the echo signal corresponding to the first neighboring pixel, where a distance between the first inflection point and the second inflection point is less than a sampling point threshold; determine a correlation coefficient between the first sampling point set and a sampling point set to which the second inflection point belongs; superpose the first sampling point set and the sampling point set to which the second inflection point belongs if it is determined, based on the correlation coefficient, that the first sampling point set and the sampling point set to which the second inflection point belongs can be superposed, to obtain a superposed sampling point set; and determine a to-be-superposed sampling point set in an echo signal corresponding to the second neighboring pixel, superpose the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtain the echo signal that corresponds to the first pixel and that is obtained after superposition processing.

Optionally, the superposition module 805 is specifically configured to: if the correlation coefficient is greater than a preset threshold, superpose the first sampling point set and the sampling point set to which the second inflection point belongs, to obtain the superposed sampling point set.

Optionally, the superposition module 805 is specifically configured to: if the correlation coefficient is greater than a preset threshold, obtain an attribute value of the echo signal corresponding to the first pixel and an attribute value of the echo signal corresponding to the first neighboring pixel, where the attribute value includes any one of the following: a signal amplitude, a peak-to-average ratio, or a signal-to-noise ratio; and if the attribute value of the echo signal corresponding to the first pixel and the attribute value of the echo signal corresponding to the first neighboring pixel satisfy a preset condition, superpose the first sampling point set and the sampling point set to which the second inflection point belongs, to obtain the superposed sampling point set.

Optionally, the preset condition is that a weighted average value of the attribute value of the echo signal corresponding to the first pixel and the attribute value of the echo signal corresponding to the first neighboring pixel is greater than the attribute value of the echo signal corresponding to the first pixel; or the preset condition is that the attribute value of the echo signal corresponding to the first neighboring pixel is greater than a preset multiple of the attribute value of the echo signal corresponding to the first pixel.

Optionally, the radar further includes an analog-to-digital converter (ADC), and correspondingly, the apparatus further includes a fifth determining module 809, configured to: determine a maximum movement distance of the target object in a data frame period based on the maximum relative motion speed between the radar and the target object and the data frame period; determine a quantity of sampling points in the maximum movement distance based on a sampling rate of the ADC; and determine the sampling point threshold based on a frame number difference between the current data frame and a data frame in which the first neighboring pixel exists and the quantity of sampling points.

Optionally, the fifth determining module 809 is specifically configured to: calculate a product of the frame number difference between the current data frame and the data frame in which the first neighboring pixel exists and the quantity of sampling points, to obtain a product result; and calculate a sum of the product result and an allowable error to obtain the sampling point threshold.

Optionally, the apparatus further includes an allocation module 810, configured to allocate storage space for information about the first pixel, where the storage space can be reused; and the information about the first pixel includes at least one of the following: the N sampling point sets, location information of at least one inflection point in the N sampling point sets, and the signal-to-noise ratio of the echo signal corresponding to the first pixel.

The echo signal processing apparatus provided in this embodiment may be configured to perform the foregoing echo signal processing method. For content and effects of the echo signal processing apparatus, refer to the foregoing method embodiment. Details are not described herein again.

Figure 9:
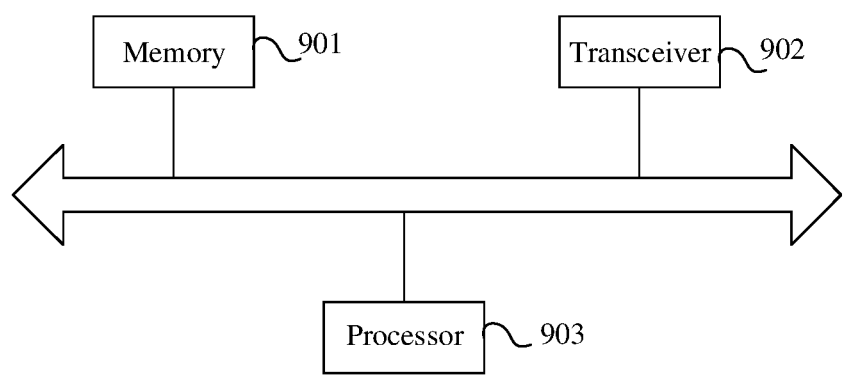
FIG. 9 is a schematic diagram of a structure of a radar according to an embodiment of this application.

FIG. 9 is a schematic diagram of a structure of a radar according to an embodiment of this application. As shown in FIG. 9, the radar includes a memory 901, a transceiver 902, and a processor 903. The memory 901 stores program instructions. The transceiver 902 is configured to receive an echo signal generated due to reflection of a target object. The processor 903 is configured to run the program instructions to perform the foregoing echo signal processing method based on the echo signal received by the transceiver.

It should be noted that the processor 903 herein may also be referred to as a signal processing unit, and the transceiver 902 herein is equivalent to the optical transmitting element 15 and the optical receiving element 16 in FIG. 1.

In addition, the radar provided in this application may further include a laser driver circuit, a laser, a scanning device, a detector, and an analog front end, and the analog front end may include a TIA and an ADC. For functions of these devices, refer to content corresponding to FIG. 1. Details are not described herein again.

The radar provided in this embodiment may be configured to perform the foregoing echo signal processing method. For content and effects of the radar, refer to the foregoing method embodiment. Details are not described herein again.

This application further provides a storage medium, including a readable storage medium and computer instructions. The computer instructions are stored in the readable storage medium, and the computer instructions are used to implement the foregoing echo signal processing method.

Based on a same technical concept, an embodiment of this application further provides a computer program product. The computer program product includes computer instructions, and the computer instructions are used to implement the foregoing echo signal processing method.

Based on a same technical concept, an embodiment of this application further provides a processor. The processor is configured to implement the foregoing method embodiments. The processor may be a chip. Optionally, all elements in this embodiment of this application may be packaged on the chip, and may be operated by a processing circuit on the chip to perform the foregoing echo signal processing method. Optionally, functions implemented by the elements in this embodiment of this application may be implemented by an apparatus including a chip or a program that can be used to perform the foregoing echo signal processing method in the embodiments of this application.

Method or algorithm steps described with reference to the content disclosed in the embodiments of this application may be implemented by hardware, or may be implemented by a processor by executing software instructions. The software instructions may include corresponding software modules. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor.

The foregoing describes the embodiments of this application with reference to the accompanying drawings. However, this application is not limited to the foregoing specific implementations. The foregoing specific implementations are merely examples, and are not used for limitation. Inspired by this application, a person of ordinary skill in the art may further make many modifications without departing from the purposes of this application and the protection scope of the claims, and all the modifications shall fall within the protection scope of this application.

What is claimed is:

1. A method, comprising:
   determining, in a current data frame, a first pixel in a receiving field of view of a radar and N sampling point sets in an echo signal corresponding to the first pixel, wherein each sampling point set comprises a plurality of data points sampled from the echo signal at regular time intervals, wherein N is an integer greater than or equal to 1, and the first pixel is any pixel in the receiving field of view, wherein each sampling point represents a discrete measurement of the echo signal amplitude at a specific time, and wherein each sampling point set comprises a predetermined number of consecutive data points sampled from the echo signal;
   identifying one or more amplitude threshold points in each sampling point set, wherein each amplitude threshold point represents a change in the echo signal amplitude greater than a threshold and corresponds to a potential reflection from the target object;
   estimating an estimated distance between the radar and a target object based on each first sampling point set of the N sampling point sets and the identified amplitude threshold points, to determine a plurality of estimated distances, and determining, based on each estimated distance of the plurality of estimated distances, M cumulative receiving fields of view corresponding to M data frames, wherein each cumulative receiving field view of view represents an expanded area of the receiving field of view that accounts for potential movement of the target object between the current data frame and a respective previous data frame, wherein each of the M cumulative receiving fields of view represents an accumulated area of potential target object locations for a respective data frame and comprises the first pixel and at least one neighboring pixel of the first pixel, wherein the M data frames are received by the radar before the radar receives the current data frame, and M is an integer greater than or equal to 1;

determining, based on each first sampling point set and its identified amplitude threshold points, a second sampling point set in echo signals corresponding to Q neighboring pixels in the M cumulative receiving fields of view, to determine a plurality of second sampling point sets, and superposing each first sampling point set and the second sampling point set corresponding to the each first sampling set, to obtain an echo signal that corresponds to the first pixel and that is obtained after superposition processing, wherein Q is an integer greater than or equal to 1; and calculating an actual distance between the radar and the target object based on the echo signal that corresponds to the first pixel and that is obtained after superposition processing.

2. The method according to claim 1, wherein estimating the estimated distance between the radar and a target object based on each first sampling point set of the N sampling point sets comprises:

determining the estimated distance between the radar and the target object based on location information of the amplitude threshold point in each first sampling point set of the N sampling point sets.

3. The method according to claim 1, wherein determining, based on each estimated distance, the M cumulative receiving fields of view in a one-to-one correspondence with the M data frames comprises:

determining a maximum horizontal movement angle value and a maximum vertical movement angle value of the target object for each estimated distance of the plurality of estimated distances based on a maximum relative motion speed between the radar and the target object, a data frame period, the respective estimated distance, and a maximum horizontal angle of view, a total horizontal angle of view, a maximum vertical angle of view, and a total vertical angle of view that are of the radar; and determining a cumulative receiving field of view of the radar for each data frame of the M data frames based on a frame number difference i between the current data frame and the each data frame, a horizontal angle value and a vertical angle value of the first pixel, the maximum horizontal movement angle value of the target object, and the maximum vertical movement angle value of the target object, wherein 1≤i≤M, and i is an integer.

4. The method according to claim 3, wherein the cumulative receiving field of view of the radar for each data frame is determined according to the following formula:

$$A=(h-HA(d)*i, h+HA(d)*i, v-VA(d)*i, v+VA(d)*i),$$

wherein A represents the cumulative receiving field of view of the radar for each data frame, represents a h−HA(d)*i minimum horizontal angle value of A, h+HA(d)*i represents a maximum horizontal angle value of A, v−VA(d)*i represents a minimum vertical angle value of A, v+VA(d)*i represents a maximum vertical angle value of A, d represents the respective estimated distance, HA(d) and VA(d) respectively represent the maximum horizontal movement angle value of the target object and the maximum vertical movement angle value of the target object, h represents the horizontal angle value of the first pixel, and v represents the vertical angle value of the first pixel.

5. The method according to claim 3, wherein before determining the cumulative receiving field of view of the radar for each data frame based on the frame number difference i between the current data frame and the each data frame, the horizontal angle value and the vertical angle value of the first pixel, the maximum horizontal movement angle value of the target object, and the maximum vertical movement angle value of the target object, the method further comprises:

obtaining a size of the target object; and wherein determining the cumulative receiving field of view of the radar for each data frame based on the frame number difference i between the current data frame and the each data frame, the horizontal angle value and the vertical angle value of the first pixel, the maximum horizontal movement angle value of the target object, and the maximum vertical movement angle value of the target object, comprises:

determining the cumulative receiving field of view of the radar for each data frame based on the frame number difference i between the current data frame and the each data frame, the horizontal angle value and the vertical angle value of the first pixel, the maximum horizontal movement angle value of the target object, the maximum vertical movement angle value of the target object, and the size of the target object.

6. The method according to claim 5, wherein the cumulative receiving field of view of the radar for each data frame is determined according to the following formula:

$$A = \left(h - \text{int}\left(\frac{TH-1}{2}\right) - HA(d)*i, h + \text{int}\left(\frac{TH-1}{2}\right) + HA(d)*i, v - \text{int}\left(\frac{TV-1}{2}\right) - VA(d)*i, v + \text{int}\left(\frac{TV-1}{2}\right) + VA(d)*i\right),$$

wherein A represents the cumulative receiving field of view of the radar for each data frame, h−HA(d)*i represents a minimum horizontal angle value of A, h+HA(d)*i represents a maximum horizontal angle value of A, v−VA(d)*i represents a minimum vertical angle value of A, v+VA(d)*i represents a maximum vertical angle value of A, d represents the respective estimated distance, HA(d) and VA(d) respectively represent the maximum horizontal movement angle value of the target object and the maximum vertical movement angle value of the target object, h represents the horizontal angle value of the first pixel, v represents the vertical angle value of the first pixel, and TH and TV respectively represent a horizontal angle value and a vertical angle value of the target object.

7. The method according to claim 1, wherein determining, based on each estimated distance, the M cumulative receiving fields of view in the one-to-one correspondence with M data frames comprises:

for each estimated distance of the plurality of estimated distances, when the estimated distance falls within a target distance interval, and the target distance interval corresponds to a cumulative receiving field of view, using the cumulative receiving field of view corresponding to the target distance interval as a cumulative receiving field of view of the radar in any data frame.

8. The method according to claim 1, wherein before estimating the estimated distance between the radar and the target object based on each first sampling point set of the N sampling point sets, to determine the plurality of estimated distances, and determining, based on each estimated distance of the plurality of distances, the M cumulative receiving fields of view in a one-to-one correspondence with M data frames, the method further comprises:

determining a signal-to-noise ratio of the echo signal corresponding to the first pixel or a signal-to-noise ratio of the at least one first sampling point set; and wherein estimating the estimated distance between the radar and the target object based on each first sampling point set of the N sampling point sets, to determine the plurality of estimated distances, and determining, based on each estimated distance of the plurality of distances, the M cumulative receiving fields of view in a one-to-one correspondence with the M data frames comprises:

when the signal-to-noise ratio of the echo signal corresponding to the first pixel or the signal-to-noise ratio of the at least one first sampling point set is less than a preset signal-to-noise ratio, estimating the estimated distance between the radar and the target object based on each first sampling point set of the N sampling point sets, to determine a plurality of estimated distances, and determining, based on each estimated distance of the plurality of distances, the M cumulative receiving fields of view in a one-to-one correspondence with the M data frames.

9. The method according to claim 1, wherein determining, based on each first sampling point set, a second sampling point set in echo signals corresponding to Q neighboring pixels in the M cumulative receiving fields of view, to determine a plurality of second sampling point sets, and superposing each first sampling point set and the second sampling point set corresponding to the each first sampling set, to obtain an echo signal that corresponds to the first pixel and that is obtained after superposition processing comprises:

for each first sampling point set, determining, in a preset order of the Q neighboring pixels based on information about a first amplitude threshold point in the first sampling point set and location information of an amplitude threshold point in an echo signal corresponding to the first neighboring pixel, a second amplitude threshold point in the echo signal corresponding to the first neighboring pixel, wherein a distance between the first amplitude threshold point and the second amplitude threshold point is less than a sampling point threshold;

superposing the first sampling point set and a sampling point set to which the second amplitude threshold point belongs, to obtain a superposed sampling point set; and determining a to-be-superposed sampling point set in an echo signal corresponding to the second neighboring pixel, superposing the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtaining the echo signal that corresponds to the first pixel and that is obtained after superposition processing.

10. The method according to claim 9, wherein the radar further comprises an analog-to-digital converter (ADC), and the method further comprises:

determining a maximum movement distance of the target object in a data frame period based on the maximum relative motion speed between the radar and the target object and the data frame period;

determining a quantity of sampling points included in each sampling point set within the maximum movement distance based on a sampling rate of the ADC; and determining the sampling point threshold based on a frame number difference between the current data frame and a data frame in which the first neighboring pixel exists and the quantity of sampling points.

11. The method according to claim 10, wherein determining the sampling point threshold based on the frame number difference between the current data frame and the data frame in which the first neighboring pixel exists and the quantity of sampling points comprises:

calculating a product of the frame number difference between the current data frame and the data frame in which the first neighboring pixel exists and the quantity of sampling points, to obtain a product result; and calculating a sum of the product result and an allowable error to obtain the sampling point threshold.

12. The method according to claim 1, wherein determining, based on each first sampling point set, a second sampling point set in echo signals corresponding to Q neighboring pixels in the M cumulative receiving fields of view, to determine a plurality of second sampling point sets, and superposing each first sampling point set and the second sampling point set corresponding to the each first sampling set, to obtain an echo signal that corresponds to the first pixel and that is obtained after superposition processing comprises:

for each first sampling point set, determining, in a preset order of the Q neighboring pixels based on information about a first amplitude threshold point in the first sampling point set and location information of an amplitude threshold point in an echo signal corresponding to the first neighboring pixel, a second amplitude threshold point in the echo signal corresponding to the first neighboring pixel, wherein a distance between the first amplitude threshold point and the second amplitude threshold point is less than a sampling point threshold;

determining a correlation coefficient between the first sampling point set and a sampling point set to which the second amplitude threshold point belongs;

superposing the first sampling point set and the sampling point set to which the second amplitude threshold point belongs when it is determined, based on the correlation coefficient, that the first sampling point set and the sampling point set to which the second amplitude threshold point belongs can be superposed, to obtain a superposed sampling point set; and determining a to-be-superposed sampling point set in an echo signal corresponding to the second neighboring pixel, superposing the superposed sampling point set and the to-be-superposed sampling point set in the echo signal corresponding to the second neighboring pixel, until to-be-superposed sampling point sets in the echo signals corresponding to the Q neighboring pixels are superposed, and after all the first sampling point sets of the N sampling point sets are superposed, obtaining the echo signal that corresponds to the first pixel and that is obtained after superposition processing.

13. The method according to claim 12, wherein superposing the first sampling point set and the sampling point set to which the second amplitude threshold point belongs when it is determined, based on the correlation coefficient, that the first sampling point set and the sampling point set to which the second amplitude threshold point belongs can be superposed, to obtain a superposed sampling point set comprises:
when the correlation coefficient is greater than a preset threshold, superposing the first sampling point set and the sampling point set to which the second amplitude threshold point belongs, to obtain the superposed sampling point set.

14. The method according to claim 12, wherein superposing the first sampling point set and the sampling point set to which the second amplitude threshold point belongs when it is determined, based on the correlation coefficient, that the first sampling point set and the sampling point set to which the second amplitude threshold point belongs can be superposed, to obtain a superposed sampling point set comprises:
when the correlation coefficient is greater than a preset threshold, obtaining an attribute value of the echo signal corresponding to the first pixel and an attribute value of the echo signal corresponding to the first neighboring pixel, wherein the attribute value comprises any one of the following: a signal amplitude, a peak-to-average ratio, or a signal-to-noise ratio; and
when the attribute value of the echo signal corresponding to the first pixel and the attribute value of the echo signal corresponding to the first neighboring pixel satisfy a preset condition, superposing the first sampling point set and the sampling point set to which the second amplitude threshold point belongs, to obtain the superposed sampling point set.

15. The method according to claim 14, wherein:
the preset condition is that a weighted average value of the attribute value of the echo signal corresponding to the first pixel and the attribute value of the echo signal corresponding to the first neighboring pixel is greater than the attribute value of the echo signal corresponding to the first pixel; or
the preset condition is that the attribute value of the echo signal corresponding to the first neighboring pixel is greater than a preset multiple of the attribute value of the echo signal corresponding to the first pixel.

16. The method according to claim 1, wherein after determining, in the current data frame, the first pixel in the receiving field of view of the radar and the N sampling point sets in the echo signal corresponding to the first pixel, the method further comprises:
allocating storage space for information about the first pixel, wherein the storage space can be reused; and
wherein the information about the first pixel comprises at least one of the following:
the N sampling point sets, location information of at least one amplitude threshold point in the N sampling point sets, or a signal-to-noise ratio of the echo signal corresponding to the first pixel.

17. An apparatus, comprising:
a transceiver; and
a processor, wherein the transceiver is configured to receive an echo signal generated due to reflection of a target object, and wherein the processor is configured to:
determine, in a current data frame, a first pixel in a receiving field of view of a radar and N sampling point sets in an echo signal corresponding to the first pixel, wherein each sampling point set comprises a plurality of data points sampled from the echo signal at regular time intervals, wherein N is an integer greater than or equal to 1, and the first pixel is any pixel in the receiving field of view, wherein each sampling point represents a discrete measurement of the echo signal amplitude at a specific time, and wherein each sampling point set comprises a predetermined number of consecutive data points sampled from the echo signal;
identify one or more amplitude threshold points in each sampling point set, wherein an amplitude threshold point represents a significant change in the echo signal amplitude and corresponds to a potential reflection from the target object;
estimate an estimated distance between the radar and a target object based on each first sampling point set of the N sampling point sets and the identified amplitude threshold points, to determine a plurality of estimated distances, and determine, based on each estimated distance of the plurality of estimated distances, M cumulative receiving fields of view corresponding to M data frames, wherein each cumulative receiving field view of view represents an expanded area of the receiving field of view that accounts for potential movement of the target object between the current data frame and a respective previous data frame, wherein each of the M cumulative receiving fields of view represents an accumulated area of potential target object locations for a respective data frame and comprises the first pixel and at least one neighboring pixel of the first pixel, wherein the M data frames are M data frames received by the radar before the radar receives the current data frame, M is an integer greater than or equal to 1;
determine, based on each first sampling point set and its identified amplitude threshold points, a second sampling point set in echo signals corresponding to Q neighboring pixels in the M cumulative receiving fields of view, to determine a plurality of second sampling point sets, and superpose each first sampling point set and the second sampling point set corresponding to the each first sampling point set, to obtain an echo signal that corresponds to the first pixel and that is obtained after superposition processing, wherein Q is an integer greater than or equal to 1; and
calculate an actual distance between the radar and the target object based on the echo signal that corresponds to the first pixel and that is obtained after superposition processing.

18. The apparatus according to claim 17, wherein the processor is further configured to:
determine the estimated distance between the radar and the target object based on location information of the amplitude threshold point in each first sampling point set of the N sampling point sets.

19. The apparatus according to claim 17, wherein the processor is further configured to:

determine a maximum horizontal movement angle value and a maximum vertical movement angle value of the target object for each estimated distance of the plurality of estimate distances based on a maximum relative motion speed between the radar and the target object, a data frame period, the respective estimated distance, and a maximum horizontal angle of view, a total horizontal angle of view, a maximum vertical angle of view, and a total vertical angle of view that are of the radar; and determine a cumulative receiving field of view of the radar for each data frame based on a frame number difference i between the current data frame and the each data frame, a horizontal angle value and a vertical angle value of the first pixel, the maximum horizontal movement angle value of the target object, and the maximum vertical movement angle value of the target object, wherein $1 \leq i \leq M$, and i is an integer.

20. The apparatus according to claim 17, wherein the processor is further configured to:

allocate storage space for information about the first pixel, wherein the storage space can be reused; and wherein the information about the first pixel comprises at least one of the following:

the N sampling point sets, location information of at least one amplitude threshold point in the N sampling point sets, or a signal-to-noise ratio of the echo signal corresponding to the first pixel.

* * * * *